(12) United States Patent
Gaebelein et al.

(10) Patent No.: US 10,272,522 B2
(45) Date of Patent: Apr. 30, 2019

(54) METHODS FOR MAKING FUNCTIONAL SLOTS

(71) Applicants: SE2QUEL MANAGEMENT GMBH, Mühlacker (DE); Jens Guenter Gaebelein, Freienfeld/Campo di Trens (IT); Jeroen Hribar, Lucerne (CH)

(72) Inventors: Jens Guenter Gaebelein, Freienfeld/Campo di Trens (IT); Jeroen Hribar, Lucerne (CH)

(73) Assignee: Avonisys AG, Zug (CH)

( * ) Notice: Subject to any disclaimer, the term of this patent is extended or adjusted under 35 U.S.C. 154(b) by 107 days.

(21) Appl. No.: 15/103,871

(22) PCT Filed: Dec. 13, 2014

(86) PCT No.: PCT/IB2014/066875
§ 371 (c)(1),
(2) Date: Jun. 12, 2016

(87) PCT Pub. No.: WO2015/087309
PCT Pub. Date: Jun. 18, 2015

(65) Prior Publication Data
US 2016/0368090 A1 Dec. 22, 2016

Related U.S. Application Data

(60) Provisional application No. 61/915,510, filed on Dec. 13, 2013.

(51) Int. Cl.
*B23P 17/02* (2006.01)
*B23P 19/04* (2006.01)
(Continued)

(52) U.S. Cl.
CPC ........ *B23K 26/146* (2015.10); *B22D 19/0072* (2013.01); *B23K 26/0608* (2013.01);
(Continued)

(58) Field of Classification Search
CPC ......... Y10T 29/49995; Y10T 29/49996; B23P 17/02; B23P 19/047; B23K 26/146;
(Continued)

(56) References Cited

U.S. PATENT DOCUMENTS 3,503,804 A * 3/1970 Schneider ............... B05B 7/228
134/1
6,141,368 A * 10/2000 Barnes .................. H01S 3/1022
372/23
(Continued)

FOREIGN PATENT DOCUMENTS

DE 102004037128 A1 3/2006
DE 102012003202 A1 8/2013

OTHER PUBLICATIONS

International Search Report and Written Opinion for PCT Application No. PCT/IB2014/066875; dated Jun. 26, 2015.

*Primary Examiner* — Jermie Cozart
(74) *Attorney, Agent, or Firm* — Tue Nguyen; patent2ip LLC

(57) ABSTRACT

A liquid-jet-guided laser system can be used to generate functional slots having different depth and sidewall profiles by applying active control of laser beam parameters. Blinds slots can be processed onto a workpiece, such as a tire mold or a turbine vane, for an insertion of a sipe or a sealing element, respectively. Through slots can also be processed onto a workpiece, such as a turbine element for cooling during operation or a semiconductor wafer for singulation purpose. The processing of the workpiece can include a two-step procedure, wherein the first step comprises a pre-cut. The pre-cut cuts a contour outline of a slot onto a workpiece corresponding to an element that is to be inserted into the slot. The second step comprises a removal cut to remove excess workpiece material in between the contour
(Continued)

outline. The liquid-jet-guided laser system can employ multiple-wavelength processing of a multiple-material workpiece.

18 Claims, 21 Drawing Sheets

(51) Int. Cl.
- B23K 26/146 (2014.01)
- B23K 26/38 (2014.01)
- B23K 26/14 (2014.01)
- B23K 26/142 (2014.01)
- B22D 19/00 (2006.01)
- B29D 30/06 (2006.01)
- B29C 33/10 (2006.01)
- B29C 33/38 (2006.01)
- B23K 26/06 (2014.01)
- B23K 103/16 (2006.01)
- B33Y 10/00 (2015.01)
- B33Y 80/00 (2015.01)

(52) U.S. Cl.
CPC ........ *B23K 26/0648* (2013.01); *B23K 26/142* (2015.10); *B23K 26/1462* (2015.10); *B23K 26/1464* (2013.01); *B23K 26/1482* (2013.01); *B23K 26/38* (2013.01); *B23P 17/02* (2013.01); *B29C 33/10* (2013.01); *B29C 33/3842* (2013.01); *B29D 30/0606* (2013.01); *B29D 30/0629* (2013.01); *B23K 2103/16* (2018.08); *B23P 19/047* (2013.01); *B29D 2030/062* (2013.01); *B29D 2030/0613* (2013.01); *B29D 2030/0617* (2013.01); *B33Y 10/00* (2014.12); *B33Y 80/00* (2014.12); *Y10T 29/49721* (2015.01); *Y10T 29/49995* (2015.01); *Y10T 29/49996* (2015.01)

(58) Field of Classification Search
CPC .. B23K 26/1462; B23K 26/142; B23K 26/38; B29C 33/3842; B29D 2030/061; B29D 2030/0613

See application file for complete search history.

(56) References Cited

U.S. PATENT DOCUMENTS

| | | | | |
|---|---|---|---|---|
| 6,931,708 | B1* | 8/2005 | Elwell | G09F 21/04 29/428 |
| 8,134,098 | B2* | 3/2012 | Muratsubaki | B23K 26/146 219/121.67 |
| 2002/0016218 | A1* | 2/2002 | Takeda | A63B 53/04 473/324 |
| 2004/0006870 | A1* | 1/2004 | Sasu | B23B 41/00 29/889.2 |
| 2005/0087521 | A1* | 4/2005 | Yang | B29C 33/3842 219/121.69 |
| 2006/0166159 | A1* | 7/2006 | Abels | A61C 7/14 433/8 |
| 2007/0063369 | A1 | 3/2007 | Byrne | |
| 2007/0158320 | A1* | 7/2007 | Kuo | B23K 26/38 219/121.84 |

* cited by examiner

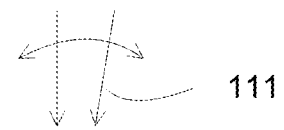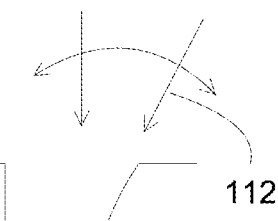
FIG. 1A   FIG. 1B   FIG. 1C
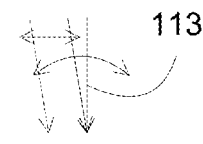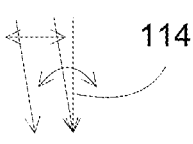
FIG. 1D   FIG. 1E   FIG. 1F
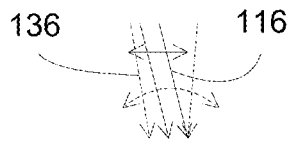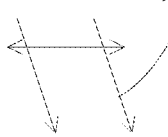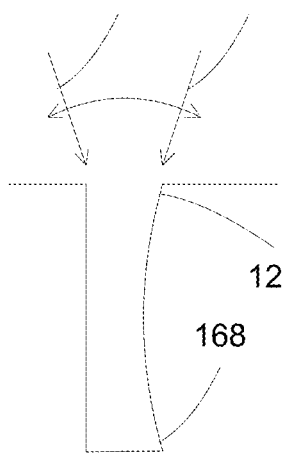
FIG. 1G   FIG. 1H   FIG. 1I

```
┌─────────────────────────────────────────────────────────────┐
│ Varying at least one of a linear speed, a rotating speed,   │
│ a power, and a number of passes of a liquid jet guided      │
│ laser system to achieve a structure having a sidewall       │
│ pattern                                                      │
│ 200                                                          │
└─────────────────────────────────────────────────────────────┘
                              │
                              ▼
┌─────────────────────────────────────────────────────────────┐
│ Tilting a liquid jet guided laser beam during cutting a     │
│ structure to form a side wall profile having a concave or   │
│ convex pattern or a taper or invert taper pattern           │
│ 210                                                          │
└─────────────────────────────────────────────────────────────┘
                              │
                              ▼
┌─────────────────────────────────────────────────────────────┐
│ Varying a number of passes for a liquid jet guided laser    │
│ beam during cutting a structure to form a side wall profile │
│ having a concave or convex pattern or a taper or invert     │
│ taper pattern                                                │
│ 220                                                          │
└─────────────────────────────────────────────────────────────┘
                              │
                              ▼
┌─────────────────────────────────────────────────────────────┐
│ Varying a power level for a liquid jet guided laser beam    │
│ during cutting a structure to form a side wall profile      │
│ having a concave or convex pattern or a taper or invert     │
│ taper pattern                                                │
│ 230                                                          │
└─────────────────────────────────────────────────────────────┘
```

*FIG. 2*

Varying at least a linear speed, a power, and a number of passes of a liquid jet guided laser system to achieve a structure having a bottom pattern
400

Varying a number of passes for a liquid jet guided laser beam during cutting a structure to form a bottom profile having a concave or convex pattern
410

Varying a power level for a liquid jet guided laser beam during cutting a structure to form a bottom profile having a concave or convex pattern
420

*FIG. 4*

Providing a workpiece consisting of a multi-material assembly wherein the individual materials of the assembly have a different laser absorption behavior
1900

Ablating a first portion of a work piece with a first laser wavelength, a first power, a first frequency and/or a first pulse length wherein the ablation process is stopped once the first portion is cut through
1910

Ablating a second portion of a work piece with a second laser wavelength, a second power, a second frequency and/or a second pulse length wherein the ablation process is stopped once the second portion is cut through
1920

*FIG. 19*

Providing a turbine blade
2100

Laser ablating cooling channels in the turbine blade, wherein the laser ablating process is performed by a liquid jet guided laser system
2110

METHODS FOR MAKING FUNCTIONAL SLOTS

This application claims priority from provisional patent application Ser. No. 61/915,510, filed on Dec. 13, 2013, entitled "Methods and systems to keep a work piece surface free from liquid accumulation while performing liquid-jet guided laser based material processing", and utility patent application Ser. No. 14/556,222, filed on Nov. 30, 2014, entitled "Methods for manufacturing a tire mold and displacing the air from the mold into a compression cavity during the tire making process", which applications are incorporated herein by reference in their entirety for all purposes.

BACKGROUND

Laser technology is applied for a large variety of material processing tasks, such as cutting, drilling, welding, marking, engraving and material ablation. Nearly all materials can be processed, e.g. metals, metal alloys, ceramics, diamonds, synthetic diamonds, carbon fibres, sapphire, quartz, glass, plastics and more. In almost every case, the laser light is focused into a very small spot onto the work piece using a focusing lens, to enable the processing task by generating sufficient energy on the work piece. The work piece therefore has to be precisely aligned into the laser focus throughout the processing task.

Liquid-jet guided laser technology, as for example described in patent EP 1940579B1 and U.S. Pat. No. 8,859,988B1, couples the laser focus into a small liquid-jet, for example, through a focusing lens. This coupling takes place in a coupling unit. The coupling unit can include a metal chamber that on the side of the focusing lens is closed with a laser protection window. On the opposite side the chamber carries a nozzle. Liquid provided to the coupling unit flows between window and nozzle and leaves the nozzle in form of a liquid-jet. The energy of the laser spot in the focal plane is captured inside the liquid-jet and guided to the work piece through internal reflection. This method eliminates the necessity to control the distance of the work piece precisely because the required energy to perform the processing is available throughout the laminar length of the liquid-jet. Any liquid that provides suitable light guide capabilities can be used to form the liquid-jet.

SUMMARY

Typical material treatments with a liquid-jet laser system involves making so-called functional slots. Functional slots can be either blind slots or through slots. For example, through slots can be cuts that penetrate a workpiece that can be used for certain functions, such as cooling or singulation of parts from the workpiece. A slot can also be a wide blind slot, where the cut does not penetrate the workpiece, for example, to allow insertion and fixation of another part, such as a sipe, or a sealing element. The present invention discloses methods and apparatuses to make such functional slots.

For practical processing of certain materials or material combinations, or to achieve certain geometries, it can be required to utilize adapted processing strategies and according apparatuses. For example, a slot of a certain depth profile may require a certain side wall angle, or a certain taper, such as cooling slots in aerospace parts.

Another requirement can be to process so-called wide slots, e.g. slots that are wider than the diameter of the liquid-jet laser. An example is a sipe slot in a tire mold, e.g. a slot in which a sipe (also referred to as lamella) is inserted and affixed. Thus for such fixation, the geometry of the slot plays an important role to enable a successful and durable fixation.

Multi-material assemblies can require the use of different parameters, e.g. laser wavelength, for processing the individual layers of the assembly. An example can be a semiconductor wafer with a combination of opaque and transparent layers that requires singulation of certain elements or the creation of vias through a complete material stack.

BRIEF DESCRIPTION OF THE DRAWINGS

FIGS. 1A-1I illustrate different depth profile patterns formed by a liquid-jet-guided laser system, according to some embodiments.

FIG. 2 illustrates a flow chart for forming sidewall patterns using a liquid-jet-guided laser system, according to some embodiments.

FIG. 4 illustrates a flow chart for forming bottom patterns using a liquid-jet-guided laser system, according to some embodiments.

FIG. 19 illustrates a flow chart for laser ablating a multi-material assembly with a liquid-jet-guided laser system, according to some embodiments.

DETAILED DESCRIPTION

Figure 3A:
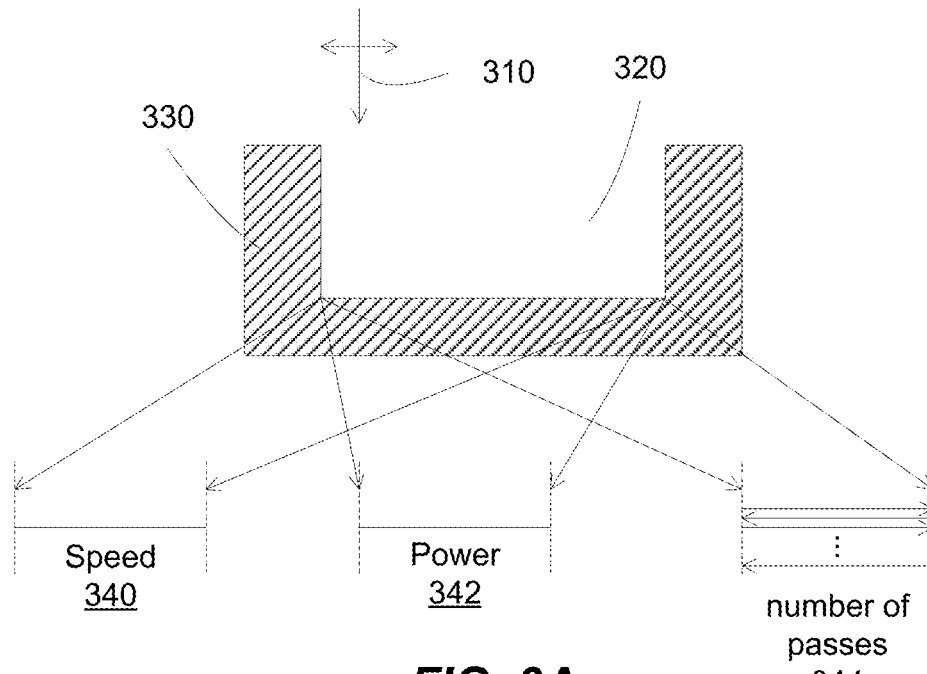
FIGS. 3A-3B illustrate different depth profiling patterns for different laser beam parameters, according to some embodiments.

Liquid-jet guided laser technology, as for example described in patent EP 1940579B1 and U.S. Pat. No. 8,859,988B1, which are hereby incorporated by reference in their entirety for all purposes, couples the laser focus into a small liquid jet, for example, through a focusing lens. The laser beam is guided in a liquid jet flow through internal reflection. The laser beam and the liquid jet are coupled through a coupling unit, which includes a chamber for accepting a liquid flow. The coupling unit can also include a nozzle, which is attached to one end of the chamber, for directing the liquid flow to form a liquid jet. The coupling unit can also include a window, which can separate the dry environment of the laser beam with the liquid environment of the liquid jet.

In some embodiments, the present invention discloses a liquid jet guided laser system for generating slots having different sidewall profiles. A movement mechanism for work piece and/or laser can allow the laser beam to cut through the material at different angles. For example, the laser beam can be perpendicular to the surface of the material, cutting through the material at a normal angle. The laser beam can form an angle with the normal direction of the material surface, cutting through the material at an angle. In addition, the depth of the cut can be controlled, for example, by running the laser beam at a slow speed or for more iteration. Thus the sidewall and the bottom topography of the angled cut can be controlled through the depth of the laser cut.

An x-y mechanism, such as a CNC mechanism (with ultimately 5 or 6 axis movement), can also be coupled to the liquid guided laser beam or work piece, which can move the laser beam in any directions to form the patterns. Together with a rotating mechanism, the laser beam can generate different depth profile patterns, including inverse taper shaped cut patterns (e.g., the opening at the surface of the material is larger than the opening at the bottom of the laser cut), taper shaped cut patterns (e.g., the opening at the surface of the material is smaller than the opening at the bottom of the laser cut), and other sidewall profiles.

FIGS. 1A-1I illustrate different depth profile patterns formed by a liquid-jet-guided laser system, according to some embodiments. In FIG. 1A, a laser beam 110 can be positioned perpendicular to the surface of an object. When the laser beam is moved in a direction parallel to the surface of the object, a cut having parallel sidewalls 120 can be formed.

In FIG. 1B, the laser beam and/or the work piece can rotate and/or tilt 111, for example, at an edge of the cut pattern toward an outside of the cut. The rotation can enlarge a sidewall 121 to form an inverse taper shaped cut pattern, which has a larger opening at a top than that at a bottom. The rotation can be somewhat uniform. The rotation can have a fixed center of rotation, for example, at a bottom of the sidewall to generate a straight edge sidewall 121.

In FIG. 1C, the laser beam can rotate 112, for example, at an edge of the cut pattern. The rotation can enlarge a sidewall 122 to form an inverse taper-shaped cut pattern, which has a larger opening at a top than that at a bottom. The rotation can be non-uniform. The rotation can have a movable center of rotation, for example, starting at a bottom of the sidewall 122 and gradually moving upward, to generate a curve edge sidewall 122.

In FIG. 1D, the laser beam can rotate 113, for example, at an edge of the cut pattern toward an inside of the cut. The rotation can enlarge a sidewall 123 to form a taper shaped cut pattern, which has a larger opening at a bottom than that at a top. The rotation can be somewhat uniform. The rotation can have a fixed center of rotation, for example, at a bottom of the sidewall to generate a straight edge sidewall 123.

In FIG. 1E, the laser beam can rotate 114, for example, at an edge of the cut pattern toward an inside of the cut. The rotation can enlarge a sidewall 124 to form a taper shaped cut pattern, which has a top opening that is smaller than an opening at a middle of the cut. The depth of the cut can be controlled, for example, by varying a speed of the laser beam, by varying a power of the laser beam, or by varying a number of passes (iterations) through the cut. A sidewall 124 can have an irregular surface, such as a small bottom and top opening and a larger opening at a middle of the cut. The edges of the sidewall 124 can be straight edges. Alternatively, the edges of the sidewall 124 can be curve edges.

In FIG. 1F, a combination of rotation can be used, including rotating 155 toward an inside of the cut to enlarge a bottom portion 165 of the cut, and then rotating 115 toward an outside of the cut to enlarge a top portion 125 of the cut. The edges of the sidewall 125 and 165 can be straight edges. Alternatively, the edges of the sidewall can be curve edges.

In FIG. 1G, the laser beam can rotate 116 or 136, for example, at an edge of the cut pattern toward an inside of the cut. The rotation can enlarge a sidewall 126 or 146 to form a taper shaped cut pattern, which has a larger opening at a bottom than that at a top. The rotation 136 can have a movable center of rotation, for example, starting at a bottom of the sidewall and gradually moving upward, to generate a curve edge sidewall 146. The rotation 116 can have a movable center of rotation, for example, starting at a top of the sidewall and gradually moving downward, to generate a curve edge sidewall 126.

In FIG. 1H, the laser beam can have a depth profile when running 117 along the opening of the cut. The variation in depth profiling can enlarge a sidewall 127 to form a middle enlarging pattern, which has a top opening and a bottom opening that are smaller than an opening at a middle of the cut. The variation in depth profiling can be performed, for example, by varying a speed of the laser beam, by varying a power of the laser beam, or by varying a number of passes through the cut. The edges of the sidewall 127 can be curved edges.

In FIG. 1I, a combination of rotation can be used, including rotating 158 toward an inside of the cut to enlarge a bottom portion 168 of the cut, and then rotating 118 toward an outside of the cut to enlarge a top portion 128 of the cut. The edges of the sidewall 128 and 168 can be curve edges.

FIG. 2 illustrates a flow chart for forming sidewall patterns using a liquid-jet-guided laser system, according to some embodiments. In operation 200, at least a parameter of a liquid-jet-guided laser beam is varied to achieve a structure having a sidewall pattern. The parameters can include a linear speed, a rotating speed, a power, and a number of passes.

Operation 210 tilts a liquid-jet-guided laser beam during cutting a structure to form a side wall profile having a concave or convex pattern or a taper or invert taper pattern. For example, by tilting the laser beam outward, e.g., away from the cut area, an inverse taper cut can be made. By tilting the laser beam inward, e.g., toward from the cut area, a taper cut can be made. By tilting inward and outward, taper and inverted taper shape can be formed. The tilting action can be performed together with the moving of the laser beam, generating a cut with different widths.

Operation 220 varies a number of passes for a liquid-jet-guided laser beam during cutting a structure to form a structure profile having a concave or convex pattern or a taper or invert taper pattern. For a perpendicular laser beam, the different numbers of passes can form a different bottom profile. More passes can generate a deeper pattern. For tilted beam, the different numbers of passes can form a different side wall profile.

Operation 230 varies a power level for a liquid-jet-guided laser beam during cutting a structure to form a side wall profile having a concave or convex pattern or a taper or invert taper pattern. Similar to the numbers of passes behavior, the laser power can form deeper pattern with higher power levels. The variation of the parameters, e.g., the linear speed, the rotational speed and angle, the number of passes and the power, can be step-wise, or can be smoothly transitioned.

In some embodiments, the present invention discloses methods and systems using a liquid-jet-guided laser system for forming structures having different profiles. For example, the bottom of a structured cut by a liquid-jet-guided laser system can be flat. In addition, other patterns can be formed, such as a concave or convex bottom surface, which can be generated, for example, by varying the speed of the laser beam, by varying the angle of the laser beam toward the object surface, by varying a power of the laser beam, or by varying a number of passes through the cut.

Figure 3B:
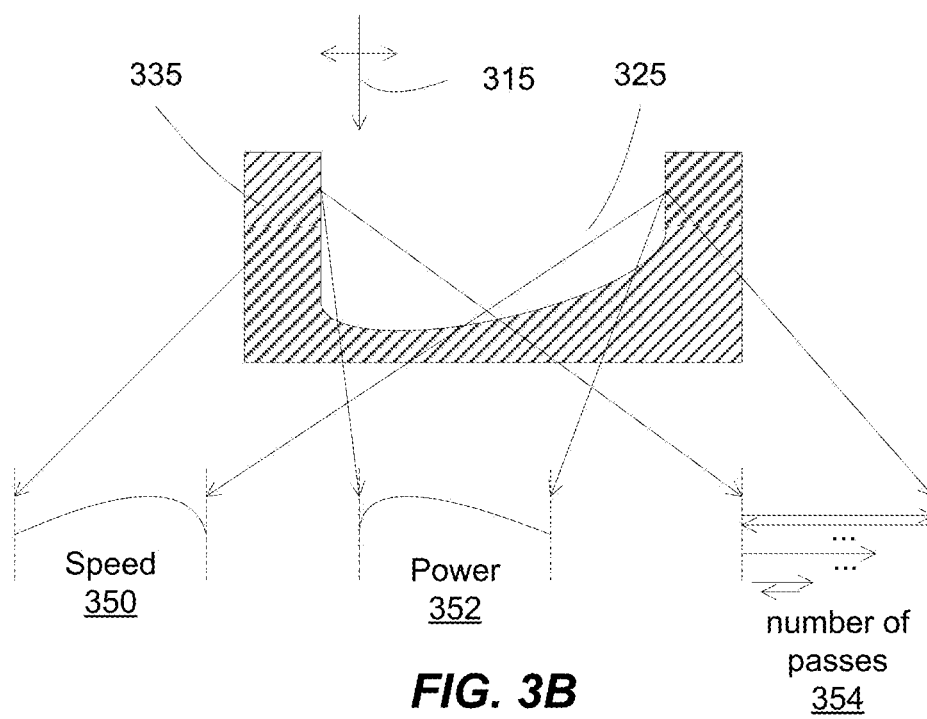

FIGS. 3A-3B illustrate different depth profiling patterns for different laser beam parameters, according to some embodiments. In FIG. 3A, a laser beam 310 can run at a constant speed 340, or a constant power 342, or a same number of passes 344 for forming a flat bottom cut 320 parallel to the top surface of the object 330.

In FIG. 3B, a laser beam 315 can run at a varied speed 350 or a varied power 352, or a different number of passes 354, thus forming a pattern bottom cut 325 with respect to the top surface of the object. For example, a slow speed portion can generate a deeper cut portion, and a higher speed portion can generate a shallower cut portion. Alternatively, a higher power portion can generate a deeper cut portion, and a lower power portion can generate a shallower cut portion. Also, different number of passes can form different profiles. For example, to form a deeper cut, a higher number of passes can be made. At a top portion, the laser beam can run from one end to the opposite end. At an intermediate portion, the laser beam can run from one end to a middle of the cut length. Thus the opposite end can have a less number of passes that the laser beam cuts through. At a bottom portion, the laser beam can run a small middle portion, thus this middle portion can have a highest number of laser passing through.

In some embodiments, the present invention discloses a liquid-jet-guided laser system for generating slots having different depth profiles. An energy modulator or a moving speed modulator can be coupled to the laser system to allow the laser beam to cut through the material at different depths. For example, a lower energy laser beam or a laser beam moving at a faster speed can form a channel having shallow depth while a higher energy laser beam or a laser beam moving at a slow speed can form a channel having deeper depth. A continuous changing profile of speed or energy can form a smooth depth profile.

In some embodiments, the present invention discloses a liquid-jet-guided laser system for generating slots having different depth profiles by applying an active control of the laser parameters. The laser beam can run from one end to the opposite end at a constant speed. The depth profile can be controlled by actively varying a laser parameter such as a frequency, a pulse length and a power. Such control commands can be stored in the parameter data for a numerical control system, such as a CNC machine.

FIG. 4 illustrates a flow chart for forming bottom patterns using a liquid-jet-guided laser system, according to some embodiments. In operation 400, at least a parameter of a liquid-jet-guided laser beam is varied to achieve a structure having a sidewall pattern. The parameters can include a linear speed, a power, and a number of passes.

Operation 410 varies a number of passes for a liquid-jet-guided laser beam during cutting a structure to form a structure profile having a concave or convex pattern. For a perpendicular laser beam, the different numbers of passes can form a different bottom profile. More passes can generate a deeper pattern. For tilted beam, the different numbers of passes can form a different bottom profile leading to a side wall portion Operation 420 varies a power level for a liquid-jet-guided laser beam during cutting a structure to form a bottom profile having a concave or convex pattern. Similar to the numbers of passes behavior, the laser power can form deeper pattern with higher power levels. The variation of the parameters, e.g., the linear speed, the number of passes and the power, can be step-wise, or can be smoothly transitioned.

In some embodiments, the present invention discloses methods to ablate material with multiple feed speeds using a liquid-jet laser based process or system. A laser light can be provided on the work piece, generating sufficient energy on the work piece. A liquid jet can be used to guide the laser beam, e.g., by internal reflection. The energy of the laser spot in the focal plane is captured inside the liquid-jet and guided to the work piece inside the liquid-jet.

Figure 5A:
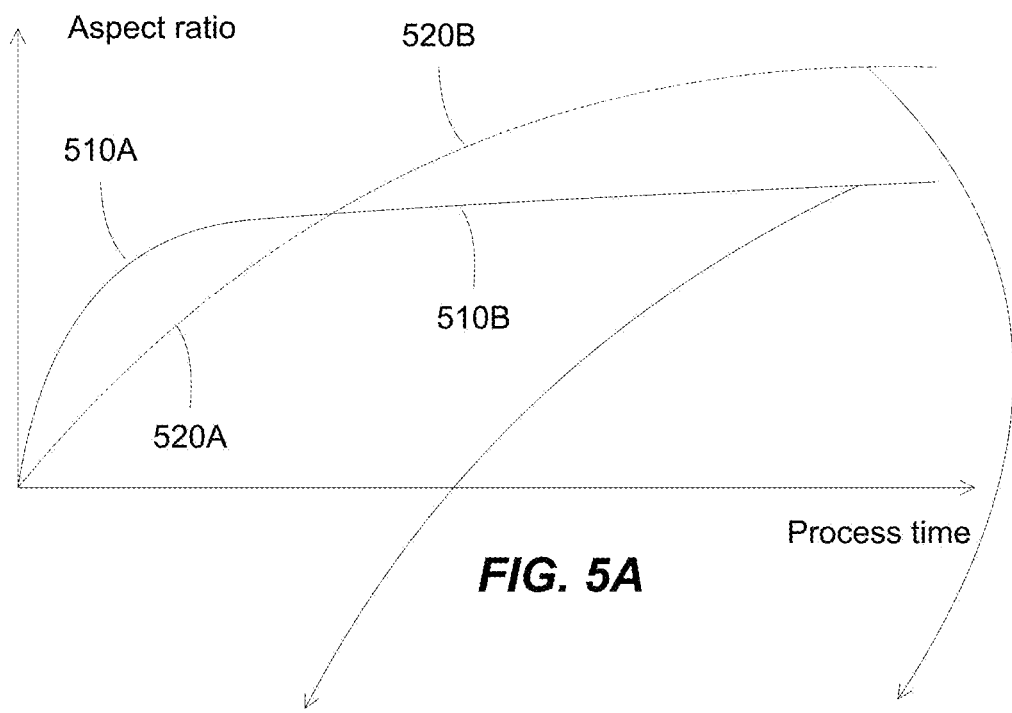
FIGS. 5A-5C illustrate the depth of a cut as a function of the laser speed according to some embodiments.
Figure 5B:
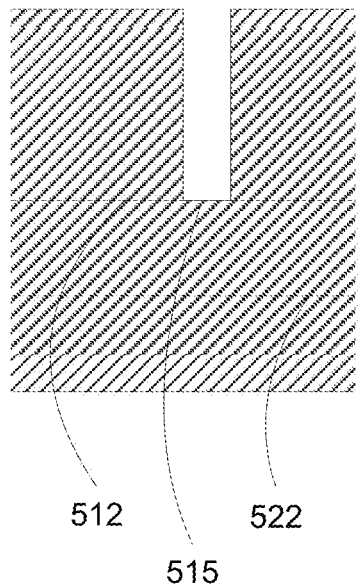
Figure 5C:
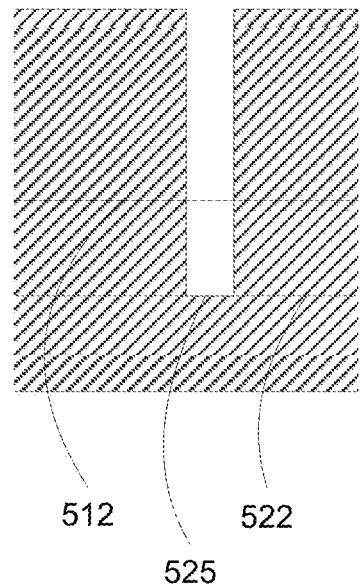

FIGS. 5A-5C illustrate the depth of a cut as a function of the laser speed according to some embodiments. FIG. 5A shows that high speed cutting 510A can cut faster than low speed cutting 520A for a same aspect ratio cut. However, ultimately, e.g., at long process time, high speed cutting 510B can cut a shallower line as compared to lower speed cutting 520B, also for a same aspect ratio cut. Thus for high aspect-ratio slots, cuts or drills in a work piece, a proper speed of the liquid-jet-guided laser beam can be required to achieve the desired depth. The comparison is based on a same width of the cut, e.g., aspect ratio of the cut instead of the depth of the cut.

FIGS. 5B and 5C show schematic configurations of a high aspect ratio cut using high speed and low speed laser beam. Maximum cutting depths can vary, for example, a shallow depth 512 for a high speed cutting process and a deep depth 522 for a low speed cutting process. In FIG. 5B, using a high speed (e.g., at about 800 mm/min), the process stops at, for example, 3 mm depth 515. The maximum 3 mm depth is achieved with multiple passes, e.g., each pass at the high speed can only cut the material at a fraction of the 3 mm depth. Further, after achieving the 3 mm depth, additional cut at the same speed does not affect, e.g., cutting, the material, leaving a maximum cut of 3 mm.

In FIG. 5C, at a low speed (e.g., at about 250 mm/min), the process can easily achieve 5 mm depth 525. Similar to the high speed cutting process, multiple passes are needed to achieve the depth, e.g., each pass at the low speed can only cut the material at a fraction of the 5 mm depth. The above examples uses a cut width of about 0.05 mm or 0.1 mm, resulting in an aspect ratio of 60:1 or 30:1 for a high speed cutting (e.g., about 800 mm/min movement of the laser beam) and an aspect ratio of 100:1 or 50:1 for a low speed cutting (e.g., about 250 mm/min movement of the laser beam).

Thus different ranges of speed are needed for ablating the material at different depth ratios. In general, slower scan speeds are required to achieve larger depths and/or higher aspect ratios. The above description is for illustration purpose, to show that the maximum depth of a liquid-jet-guided laser ablation process can depend on the cutting speed of the liquid jet. In practice, the speeds and amount of passes vary depending on the material that is ablated.

In some embodiments, the present invention recognizes that low cutting speed can cause recasting of ablated material, resulting in debris or contaminants around the cut. In addition, high cutting speed might not be able to achieve the desired results, such as not ablating material, or interrupting the overlap between the individual laser pulses.

In some embodiments, the present invention discloses a two-level depth cutting method to improve the ablation process for high-aspect ratios, for example, higher than 5 mm deep slit with higher than 10:1 ratio. A first level uses a high speed for the laser beam to achieve a fast cutting, and a second level uses a low speed for the laser beam to achieve a desired depth. The time to switch between the first and second levels can be selected to optimize the total cutting time, such as at a time that the cutting rate of the fast cutting speed becomes similar to the cutting rate of the slow cutting speed. In general, a high cutting speed can be used for a first portion of the cut, followed by a low cutting speed for the remaining of the cut. For example, for a 4 mm deep slit with 25:1 aspect ratio, a high speed cutting is performed for the first 3 mm and a slow speed cutting is performed for the last 1 mm.

In some embodiments, the high speed cutting can be performed until achieving the maximum depth, or close to the maximum depth, such as reaching 70, 80, or 90% of the maximum depth.

Alternatively, a calculation can be first performed to obtain the overall cutting time as a function of the time for performing the high speed cut. The time and/or depth of the high speed cutting process can be determined to achieve an optimum overall cutting time. The two-level cutting process can improve the overall process time, e.g., the time required to achieve the desired ablation process.

In some embodiments, multiple steps using multiple level can be used. In addition, continuous speed changes can also be used. The speed change can be used to optimize, e.g., minimizing the process time or the power usage.

Figure 6A:
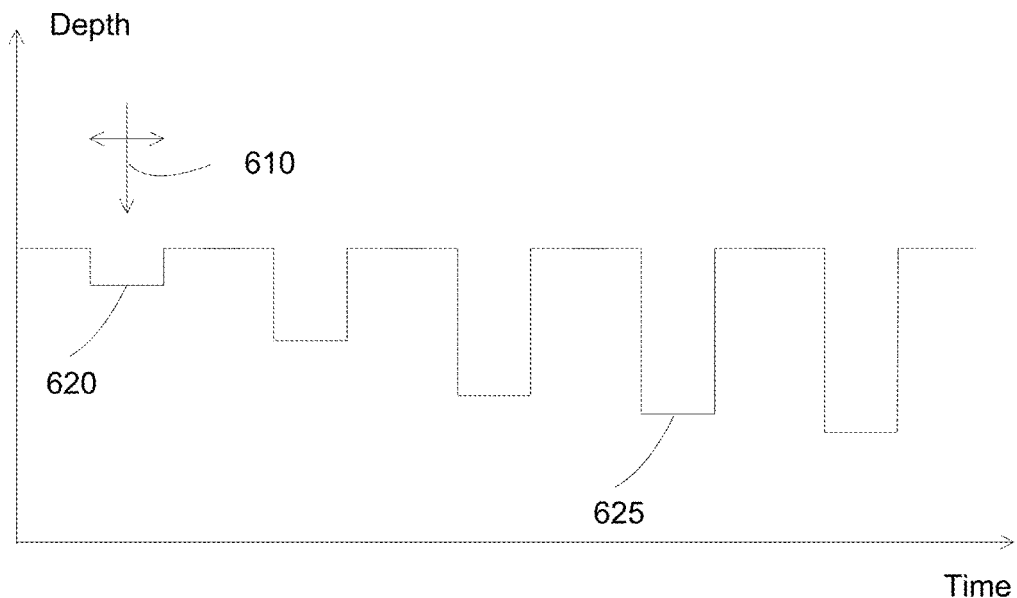
FIGS. 6A-6B illustrate a schematic of a two-level depth cutting method, according to some embodiments.
Figure 6B:
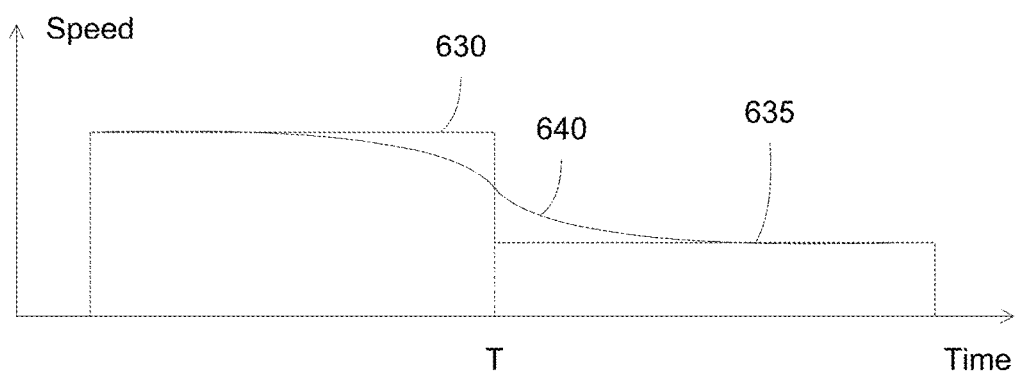

FIGS. 6A-6B illustrate a schematic of a two-level depth cutting method, according to some embodiments. FIG. 6A shows different snap shots of a cross section of a cutting profile as a function of process time, due to a laser beam 610. For example, at an early time, the laser beam 610 can form a shallow cutting profile 620. At a later time, the laser beam can form a deeper cutting profile 625. FIG. 6B shows a moving speed of the laser beam 610, including two levels of speed. During the shallow cutting, e.g., cutting profile 620, a faster speed 630 can be used. At a later time, the speed is changed to a slow speed 635, for cutting a deeper cutting profile 625. The speed can be transitioned at time T, chosen for optimizing the total cutting time. Other speed profiles can be used, such as a continuous transition profile 640, which is smoothly changed from a high speed level to a slow speed level.

In some embodiments, the process of cutting a slot with liquid-jet laser can be non-linear. When using a fix speed to achieve, for example, 3 mm this means that the $1^{st}$ mm goes fast, the $2^{nd}$ mm is slower and the $3^{rd}$ mm is even slower. So for example for a 3 mm cut: the first 5 passes can cut 1 mm depth, the next 10 passes can cut a next 1 mm (resulting in 2 mm depth after 15 passes), and the next 25 passes can cut a next 1 mm (resulting in 3 mm depth after 40 passes). Thus, changing speeds can be beneficial when reaching the asymptotic maximum depth for a certain speed.

Figure 7A:
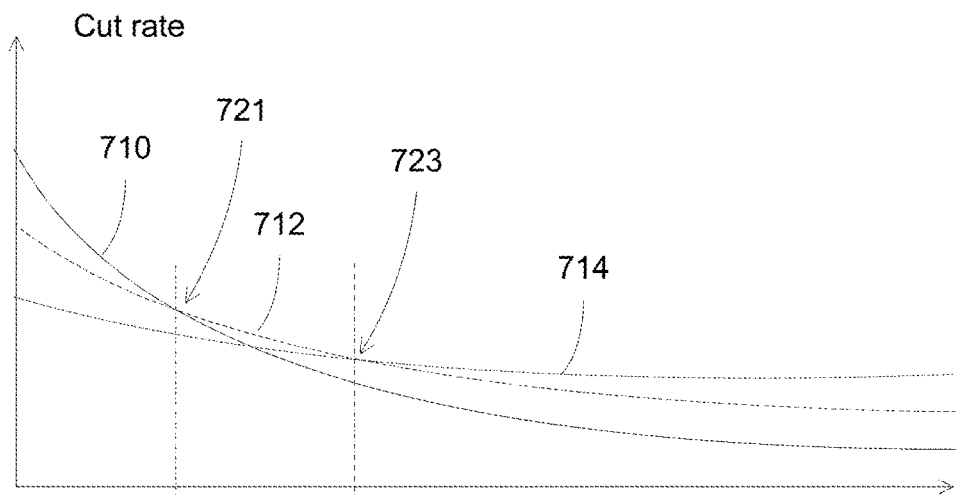
FIGS. 7A-7D illustrate schematics of cutting processes with varied speed according to some embodiments.
Figure 7B:
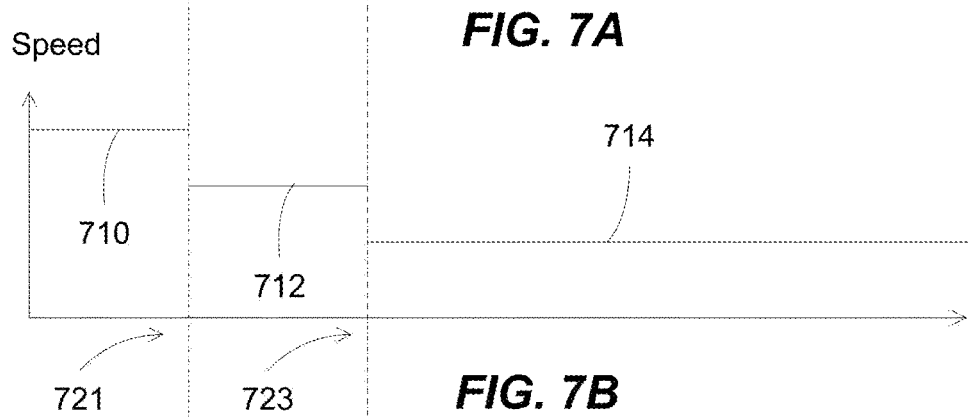

FIGS. 7A-7B illustrate schematics of cutting processes with varied speed according to some embodiments. In FIG. 7A, the cut rates of a liquid-jet-guided laser beam are shown as a function of the cut aspect ratios for different laser beam speed. At high speed 710, fast cutting rates can be achieved for low aspect ratios, and low cutting rates can be achieved for high aspect ratios. At medium speed 712, medium cutting rates can be achieved for low aspect ratios, and medium cutting rates can be achieved for high aspect ratios. At slow speed 714, low cutting rates can be achieved for low aspect ratios, and high cutting rates can be achieved for high aspect ratios. There can be transition points between the speed curves, for example, a transition point 721 between the fast speed 710 and the medium speed 712, and a transition point 723 between the medium speed 712 and the slow speed 714.

FIG. 7B shows a varied speed for a laser beam that can be optimum for the three speeds 710, 712, and 714. At a first regime, e.g., low aspect ratio due to the beginning of the cut, a high speed 710 can be used. At the transition point 712, the speed changes to a medium speed 712. At the transition point 714, the speed changes to a slow speed 714. Thus the chosen speed configuration can provide a fastest cutting rate for the three speeds of the laser beam.

Figure 7C:
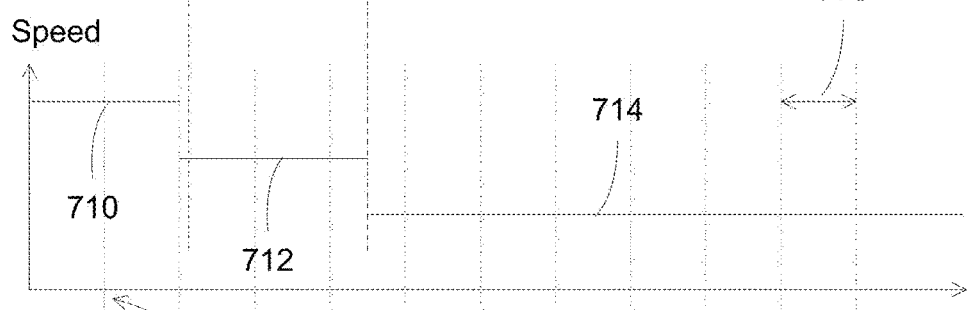

FIG. 7C shows a varied speed for a laser beam, taken into account a length of the cut. For example, the speed can be changes based on an integer number of length of the cut 770. For the first regime, the high speed 710 can be used for a number of passes through the cut. When the laser beam reaches the end of the cut, the laser speed can change to the medium speed 712. The medium speed 712 can be used for another number of passes through the cut. When the laser beam reaches the end of the cut, the laser speed can change to the slow speed 714.

Figure 7D:
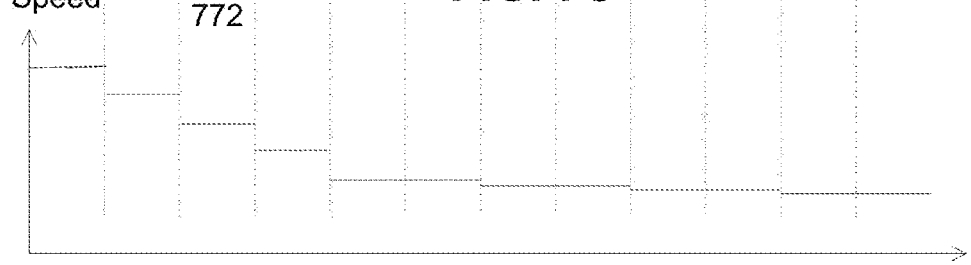

FIG. 7D shows that the speed can vary more for more than three speeds. For example, at each pass through the cut, the aspect ratio can change, and the speed can change accordingly to obtain the highest cut rate for that aspect ratio. Thus the speed can be step-wise changed for each pass through the cut.

In some embodiments, the depth of a cut is controlled by a laser power or a laser frequency, or a pulse length to achieve best synchronization between material evaporation and a consecutive laser pulse. The laser beam can run at a constant speed. The depth profile can be controlled by actively varying a laser parameter such as a frequency, a pulse length and a power. Such control commands can be stored in the parameter data for a numerical control system, such as a CNC machine.

Figure 8A:
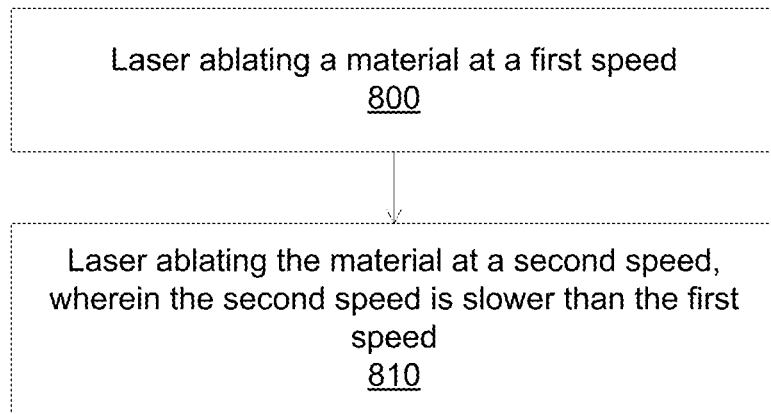
FIGS. 8A-8B illustrate flow charts for a laser ablating process, according to some embodiments.
Figure 8B:
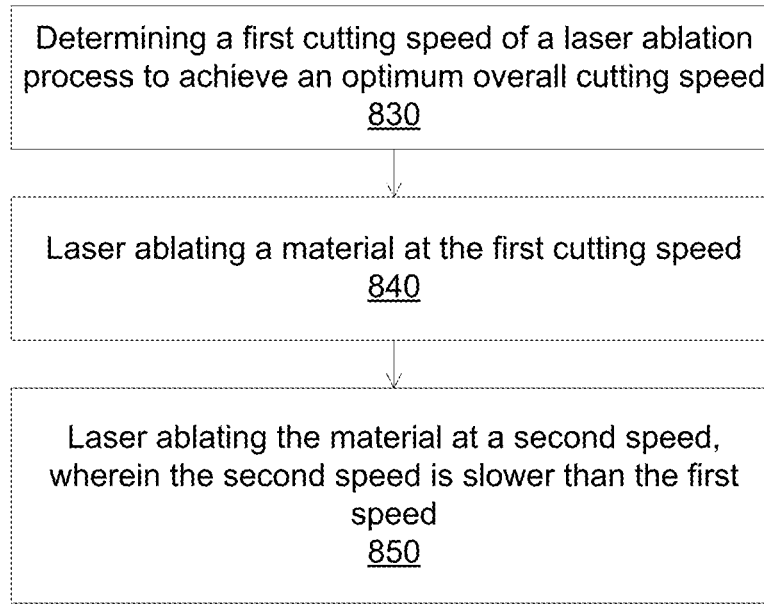

FIGS. 8A-8B illustrate flow charts for a laser ablating process, according to some embodiments. In FIG. 8A, operation 800 laser ablates a material at a first speed. Operation 810 laser ablates the material at a second speed, wherein the second speed is slower than the first speed. The laser ablation process can be performed by a liquid-jet-guided laser system.

In FIG. 8B, operation 830 determines a first cutting speed of a laser ablation process to achieve an optimum overall cutting speed. The laser ablation process can include a two speed-level laser ablation process, such as a high laser cutting speed, followed by a lower cutting speed. Operation 840 laser ablates a material at the first speed. Operation 850 laser ablates the material at a second speed, wherein the second speed is slower than the first speed.

Alternatively, the optimum overall cutting speed can be obtained by selecting a second lower laser cutting speed. For example, the overall cutting speed can be determined as a function of either the high speed cutting characteristics or the low speed cutting characteristics, such as cutting time.

In some embodiments, the two (or more) level cutting process can be used for cutting through materials having a coating. A first laser cutting level can include a first speed or a first power to cut through the coating. A second cutting level can include a second speed or a second power to cut through the material to form the structure. The first and second speeds or powers can be different.

In some embodiments, methods for making functional slots in tire molds are described. Winter tires and rain tires can have fine lamella structures to increase the wet grip of the tire. Such structures must be implemented in the respective negative tread mold with which the tire is cured. Lamellas, also referred to as sipes, commonly comprise of a metallic material and can be mounted in a tire mold in various ways.

In some embodiments a tire mold can be produced by casting a metallic alloy. In a first step, a ceramic or plastic model of the positive tire tread surface is made. This model compromises the complete tread pattern and also includes slots in which the sipes can be placed during the casting process. After the casting process the sipes are firmly fixed in the casted mold segment body.

In some embodiments, a tire mold can be produced by milling the negative mold segment or the negative tread pattern directly from a solid block material. This is also referred to as direct milling. In such case, the sipes must be mounted to the negative mold segment in a consecutive step. For that purpose, blind slots must be formed in the tread surface of the mold that allow the insertion and fixation of a sipe. Such slots for example can be formed by, for example, mechanical micro milling or spark erosion technology. A typical width of such milled sipe slot is 0.6 mm or 0.5 mm. A typical depth of such sipe slots is 2 mm or 3 mm. The sipe slot must have a sufficient depth because the sipe is for example affixed into such sipe slot by utilizing the lateral friction forces to press-fit the sipe into the slot. Slot depth is important to provide sufficient contact area. Accurate slot width tolerances are important as well to provide sufficient lateral friction between the mold body and the sipe.

In some embodiments, to optimize the balance between wet grip and low rolling resistance of a tire, narrower sipes, for example 0.2 mm or 0.3 mm wide can be introduced. In such cases the mechanical milling and spark erosion can be limited in their ability to make an adequate blind slot for sipe insertion in the negative mold segment. In case of mechanical milling, there are 0.2 mm milling tools available, but the slot depth that such tools can make in a tire mold is strongly limited due to the tool shank height and insufficient tool stiffness (e.g. high risk of tool breakage in case of material impurities in the mold material). The slot depth can be limited to as little as 1 mm, which is not sufficient to provide the required clamping force during the tire de-molding process, thus the sipe can be pulled out of the mold and stick into the cured tire. In addition, the process speed of a mechanical milling process can be insufficient when making narrow slots. The process speed can be proportional to the slot width, e.g. an 0.6 mm wide slot is manufactured a lot quicker than an 0.4 mm wide slot. Spark erosion requires adapted electrode geometries for each different geometry or length of a sipe. Many different geometriesor lengths of sipes can be applied to a complex tread pattern such as a winter tire, thus spark erosion is not a preferred method due to high cost and low flexibility. Electrode wear furthermore has a direct impact on the width tolerance of the slot and this on the fit quality of the sipe.

In some embodiments, the present invention discloses making blind slots in a tire mold that are suitable for sipe insertion and affixation using a liquid jet laser. Liquid-jet-guided laser technology, as for example described in patent EP 1940579B1 and U.S. Pat. No. 8,859,988B1, which are hereby incorporated by reference in their entirety for all purposes, can be used to make blind slots in tire molds that are 0.03-2 mm wide and 0.1-20 mm deep, for example 0.2 mm or 0.5 mm wide, and 1 mm or 5 mm deep. The liquid jet laser can be mounted to an x-y mechanism such as a CNC machine, ultimately with 5 or 6 axis to precisely follow the topography of a tire mold surface. A slot can have the same width as the diameter of the liquid-jet, for example 0.05 mm or 0.08 mm. In such case, the amount of laser passes, as well as the laser speed determine the achievable depth of the slot. A slot can also have a larger width as the diameter of the liquid-jet, for example 0.2 mm or 0.4 mm. The slot contour can be of any freeform shape such as a straight line, a sine, or a wave pattern to exactly match the shape of the sipe that must be inserted.

In some embodiments, the present invention discloses slots having depth and sidewall profiles that are configured to optimize an insertion and fixation of sipes, which are configured to form small channels in the cured objects, such as small channels in a rubber tire or a rubber shoe sole. The slots can have shapes, e.g., sidewall and depth profiles, that are configured to allow narrow sipe dimensions and locking features. For example, the liquid-jet-guided laser system can provide slots as small as 30 microns, which can allow the formation of sipe slots in a mold with dimensions greater than 30 microns, such as 0.2 or 0.4 mm. Further, the depth profiles of the slots can be configured to provide locking features to hold the sipes in place.

Figure 9A:
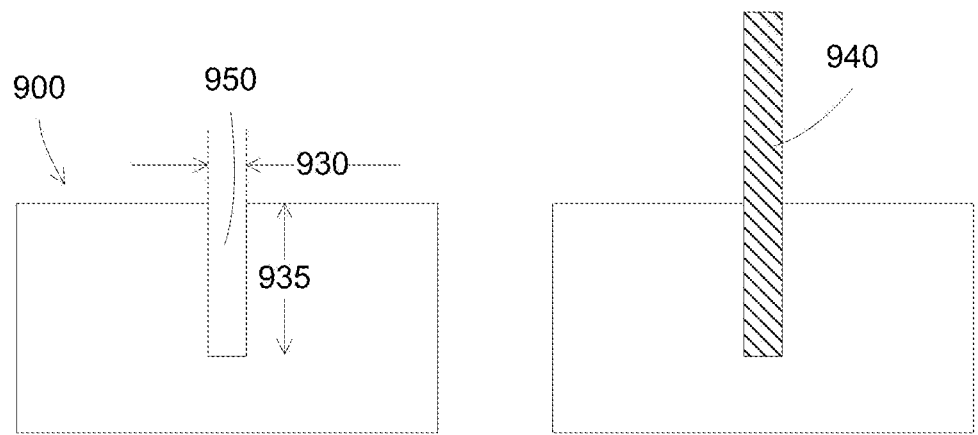
FIGS. 9A-9B illustrate slots for sipe insertion, according to some embodiments.
Figure 9B:
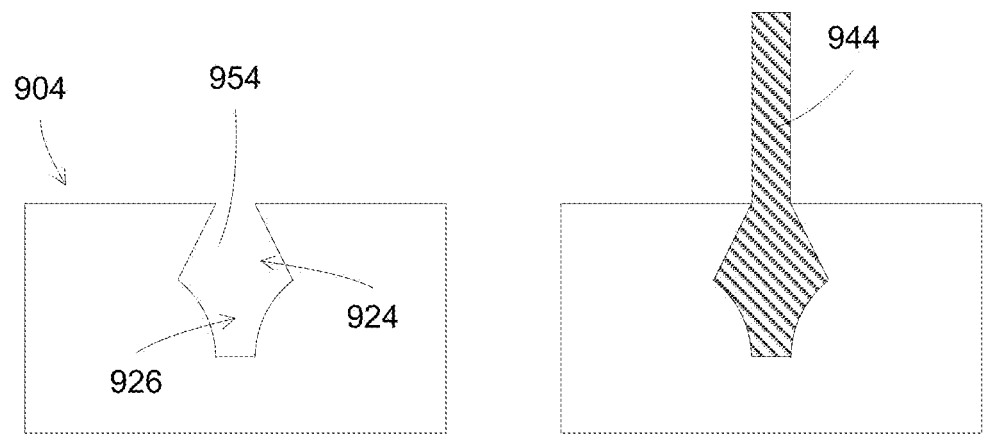

FIGS. 9A-9B illustrates lots for sipe insertion, according to some embodiments. In FIG. 9A, a slot 950 can be formed in a workpiece (e.g. a tire mold) 900. The slot 950 can have an aspect ratio that is optimized for the sipe. For example, the slot 950 can have a depth 935 between 0.5 and 5 mm, which is configured to support the sipes. The slot 950 can have a width 930 between 0.1 and 0.8 mm. The liquid-jet-guided laser beam can be used to form these slots, depending on the requirements of the sipes. The slot 950 can have straight sidewalls, to allow insertion of a sipe 940 having parallel side surfaces. The slot width 930 can be optimized to allow a press fit of the sipe, e.g. a self-locking of the sipe.

In FIG. 9B, a slot 954 can be formed in a workpiece (e.g. a tire mold) 904. The slot 954 can have a top portion for locking and a bottom portion for ease of insertion. For example, a slot can have a top opening smaller than a middle area, such as having a diamond or a quasi-diamond cross section. The slot can have a top portion 924 having a top opening smaller than a bottom area, such as a trapezoid cross section. The top portion 924 can behave as a locking feature, preventing the sipe 944 from getting loose, e.g., removed from the slot. The slot can have a bottom portion 926 having a top area larger than a bottom area, such as an invert trapezoid cross section. The bottom portion 926 can facilitate the insertion of the sipe 944 into the slot 954, since the small bottom area can easily enter the slot opening. The bottom portion 926 can have a curve sidewall for easier insertion. Other slot configurations, e.g., cross sections, can be used, including slots having straight sidewall diamond shapes, slots having quasi diamond shapes, and slots having curve sidewall diamond shapes.

Figure 10:
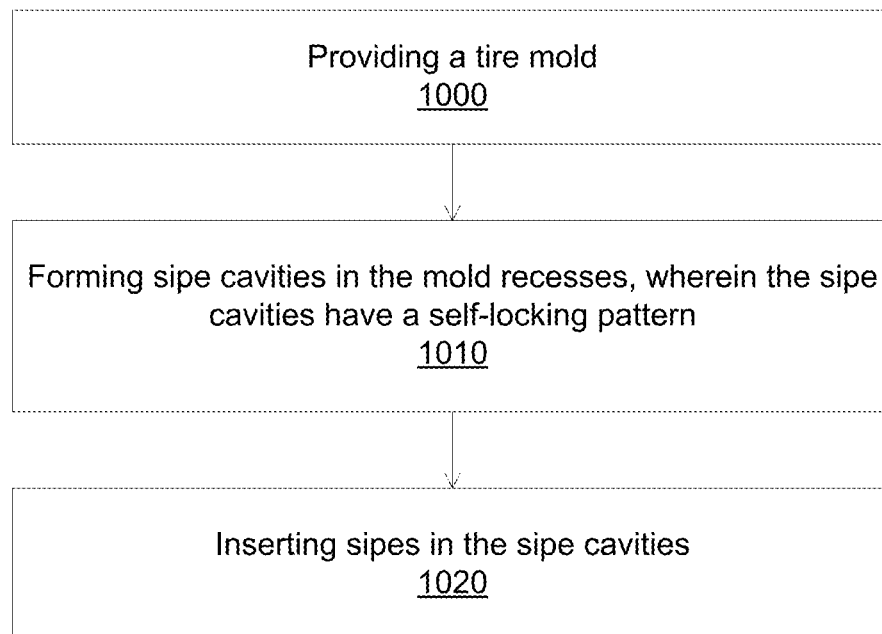
FIG. 10 illustrates a flow chart for forming a mold according to some embodiments.

FIG. 10 illustrates a flow chart for forming a mold according to some embodiments. Operation 1000 provides a tire mold. Operation 1010 forms sipe cavities in the mold recesses. The sipe cavities can have a self-locking pattern. For example, the sipe cavities can have parallel side walls optimized for a press fit, or can have an inverted taper shape, which prevents the sipes from being easily removed from the sipe cavities. The sipe cavities can be formed by a liquid-jet-guided laser system. Operation 1020 inserts sipes in the sipe cavities.

In some embodiments, the present invention discloses a two-step cutting method using a liquid-jet-guided laser system for creating slots in a workpiece to accept an insertion of an element by means of press fitting. For example, press fitting a sipe into a slot of a tire mold, or press fitting a sealing element into a slot of a turbine element. Typically, a sipe or a sealing element have a dimension wider than the diameter of the liquid-jet. In such cases, a so-called wide slot can be made to allow an adequate press fit.

Figure 11A:
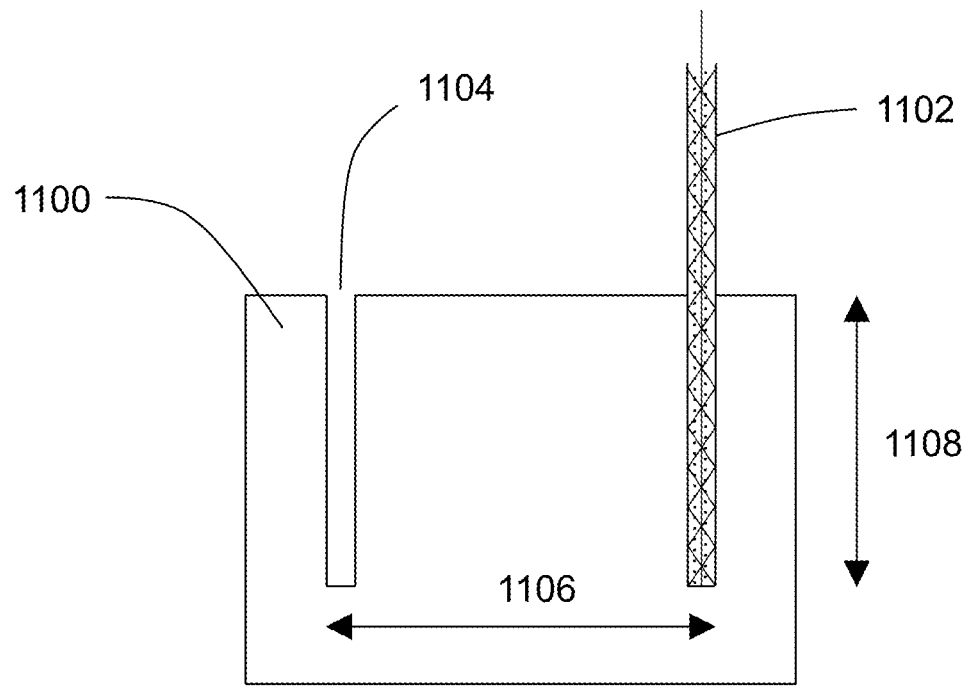
FIGS. 11A-11B illustrate a two-step cutting method using a liquid-jet-guided laser system, according to some embodiments.
Figure 11B:
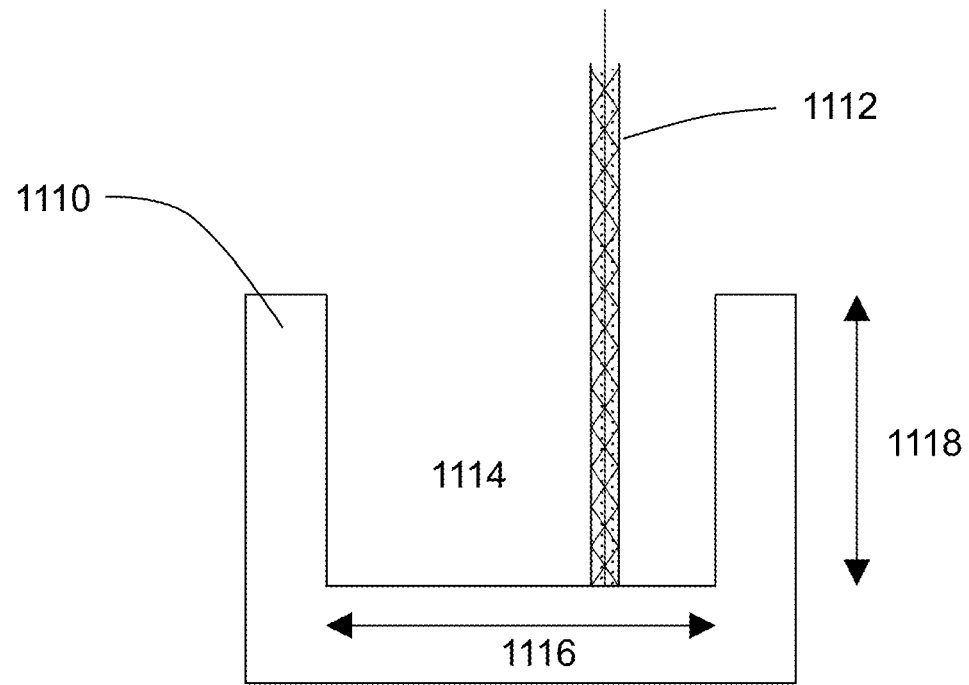

FIGS. 11A-11B illustrate a two-step cutting method using a liquid-jet-guided laser system, according to some embodiments. In FIG. 11A, a laser beam 1102 can process a workpiece 1100 to form a contour cut 1104 in a first step. Such contour cut 1104 can form the outline of a wide slot for inserting an element (e.g., a sipe in a tire mold or a sealing element in a turbine vane). The laser beam 1102 follows precisely the geometry of the element that will be inserted, such as a wave shape or a straight line shape. The contour cut 1104 can reach a desired depth 1108 of a final form of the slot, for example, 3 mm or 5 mm. Additionally, the contour cut 1104 can reach the desired width 1106 of the final form of the slot, for example, 0.2 mm or 0.6 mm, depending on the profile of the element to be inserted. The processed wide slot may require to be slightly wider or narrower than the element to be inserted (e.g. narrower for a press fit). In the first step of the contour cut 1104, it can be desired to perform such a cut at a lower power level and/or a lower speed of the laser beam 1102 in order to ensure a good side wall quality and sharp entry edges.

In FIG. 11B, material within the contour cut 1104 of the first step is removed by the laser beam 1112 in a second step of the two-step cutting method. The removal cut 1114 can be performed at a higher (e.g. more aggressive) laser power and/or at higher feed speeds. The purpose of this step is to remove excess workpiece material, e.g. from a tire mold, or from a turbine element, quickly and efficiently without the consideration for side-wall precision, such as required in the first step of the contour cut 1104. The depth 1118 of the removal cut 1114 can be matched with the depth 1108 of the contour cut 1104, for example, 3 mm or 5 mm (to coincide with the example given in FIG. 11A). However, the present invention is not so limited, and may require non-uniform depth, e.g. the depth 1108 of the contour cut 1104 can be deeper and/or shallower than the depth 1118 of the removal cut 1114, for example, to accommodate a particular shape of an element to be inserted in the slot.

Figure 12A:
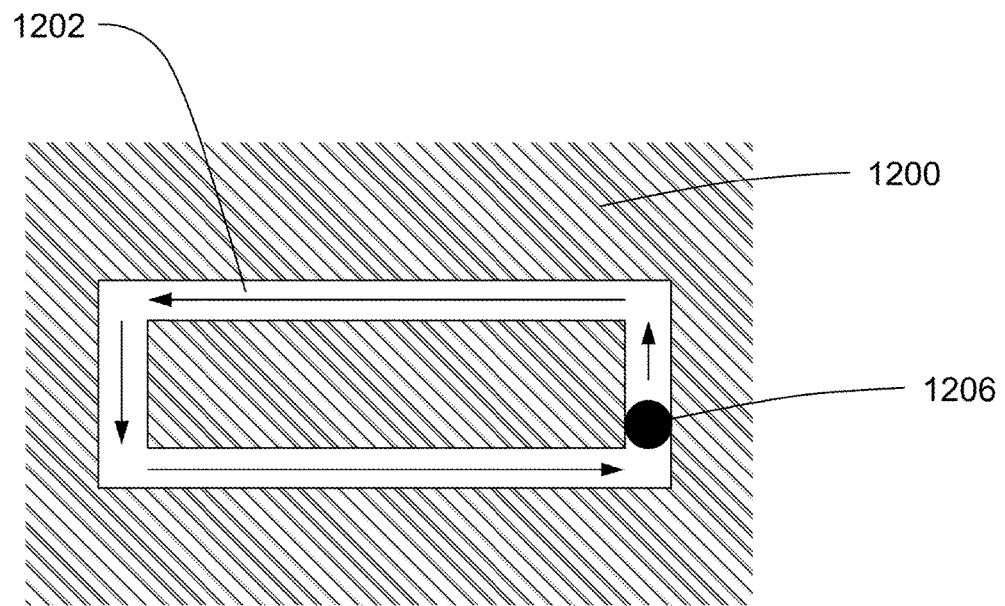
FIGS. 12A-12B illustrate top views of the two-step cutting method using the liquid-jet-guided laser system, according to some embodiments.
Figure 12B:
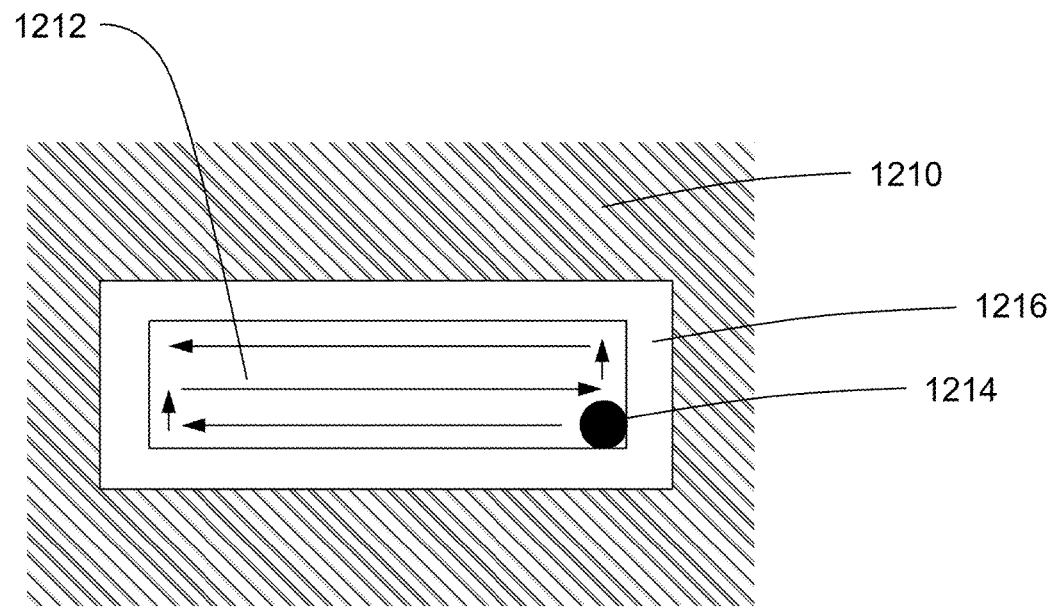

FIGS. 12A-12B illustrate top views of the two-step cutting method using the liquid-jet-guided laser system, according to some embodiments. In FIG. 12A, a laser beam 1206 can process a workpiece 1200, e.g. a tire mold or turbine element, to form a contour cut 1202 in a first step. Such contour cut 1202 can form the outline of a wide slot for inserting an element (e.g., a sipe in a tire mold or a sealing element in a turbine vane). The laser beam 1206 follows precisely the geometry of the element that will be inserted, such as a wave shape or a straight line shape. In the first step of the contour cut 1202, it can be desired to perform such a cut at a lower power level and/or a lower speed of the laser beam 1206, relative to the power level and/or speed of the laser beam 1214 of the removal cut 1212 of the second step of FIG. 12B in order to ensure a good side wall quality and sharp entry edges.

In FIG. 12B, material within a contour cut 1216 is removed by the laser beam 1214 in a second step of a two-step cutting method. The removal cut 1212 can be performed at a higher (more aggressive) laser power and/or at higher feed speeds, relative to the contour cut 1202 of FIG. 12A. Any pattern of cutting can be used in a removal cut 1212, such as a winding pattern, that will quickly and efficiently remove excess material located between the contour cut 1216. The depth of a removal cut 1212 can be matched with the depth of the contour cut 1216, for example, 3 mm or 5 mm. However, the present invention is not so limited, and may require non-uniform depth, e.g. the depth of the contour cut 1216 can be deeper and/or shallower than the depth of the removal cut 1212, for example, to accommodate a particular shape and size of an element to be inserted in the slot.

In some embodiments, the present invention discloses a method of easy reaction on tolerance of a dimension of an element to be inserted into a slot (e.g. a sipe) by adapting a contour cut outline of the workpiece (e.g. a tire mold). Using a liquid-jet-guided laser system, this can be done by virtually increasing or decreasing the nozzle diameter inside an NC program of a CNC machine, without physically changing the nozzle itself. For example, a sipe can require a slot of 0.40 mm wide for a press fit fixation. In a new batch of sipes, however, the sipe width increased due to tolerance by 0.02 mm, and thus a slot for accepting the sipe must increase to 0.42 mm width. Instead of using a 0.02 mm larger diameter nozzle, or instead of making a new program with the 0.42 mm outline for the CNC machine, it is sufficient to virtually decrease the nozzle diameter, e.g. to tell the CNC machine it has a 0.02 mm smaller nozzle, but without physically changing the nozzle itself. The CNC machine can now automatically calculate an adapted outline of a contour cut without changing the nozzle itself and/or without making a new program.

Figure 13A:
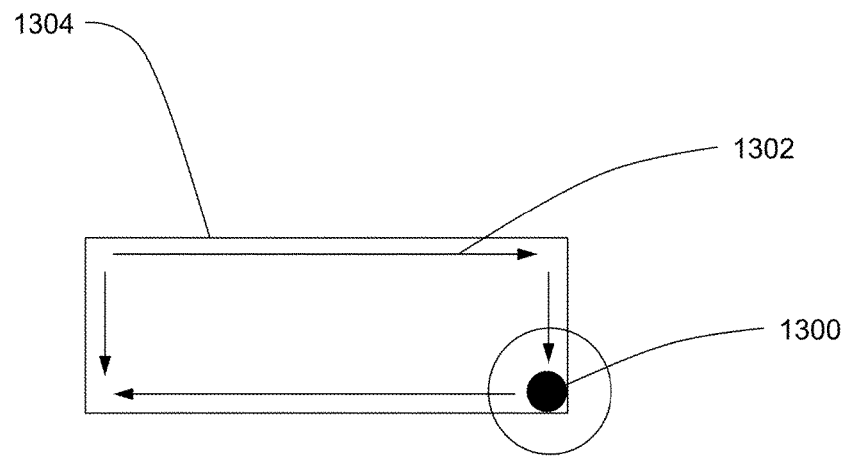
FIGS. 13A-13B illustrate tolerance compensation for elements to be inserted into a slot made by a liquid-jet-guided laser system on a workpiece, e.g. a tire mold or a turbine vane, according to some embodiments.
Figure 13B:
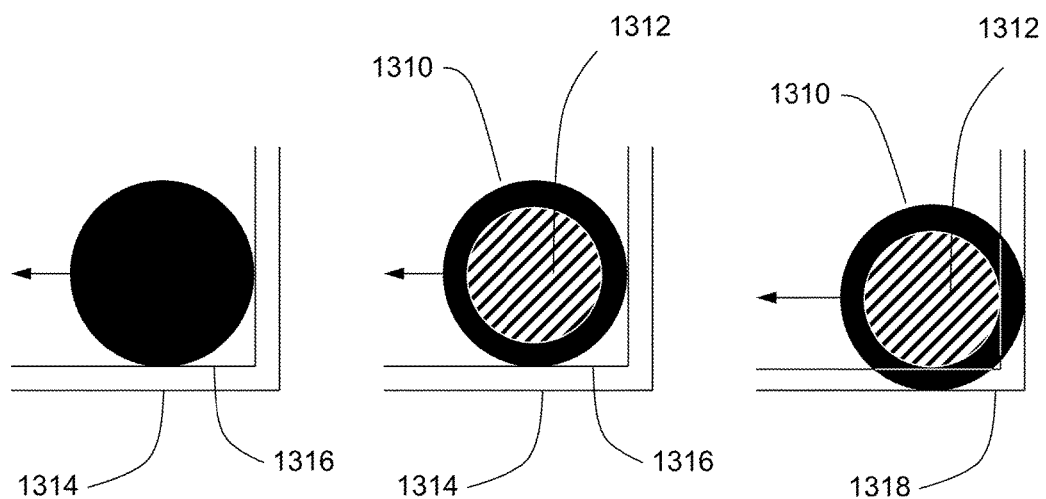

FIGS. 13A-13B illustrate tolerance compensation for elements to be inserted into a slot made by a liquid-jet-guided laser system on a workpiece, e.g. a tire mold or a turbine vane, according to some embodiments. In FIG. 13A, a laser beam 1300 performs a contour cut 1302, following a geometry of an element. The resultant contour outline 1304 of the slot can be reflective of the shape and size of the element to be inserted and press fitted into the slot.

In FIG. 13B, a sipe with tolerance 1314 from a new batch may have a change in width, e.g. 20 um wider. A nozzle diameter 1310 of the liquid-jet-guided laser system can be increased or decreased to accommodate a sipe with tolerance 1314. Generally, the center of the nozzle diameter 1310 is half the nozzle diameter 1310 and the effective outline 1316 of a slot is created by interaction of the outer part of the liquid jet formed by the nozzle 1310 and the work piece (e.g. the laser light touches the work piece on the bottom and the circumference of the liquid jet). If the slot due to tolerance now must be 20 um wider, a CNC program must move the center of the real nozzle diameter 1310 by 10 um, half of that width change, in order to expand the closed contour by 20 um in total. This can be done by making a new program that calculates a new outline based on the same real nozzle diameter 1310. Alternatively, using the existing program and the existing nozzle 1310, a virtual nozzle diameter 1312 based on the tolerance can be set (e.g. decreased by 20 um). The CNC program will now position the center of the virtual nozzle diameter 1312 so that it would touch the contour outline without tolerance 1316 and thus the real nozzle diameter 1310 is also moved by the same distance and can make the new contour with tolerance 1318.

Figure 14:
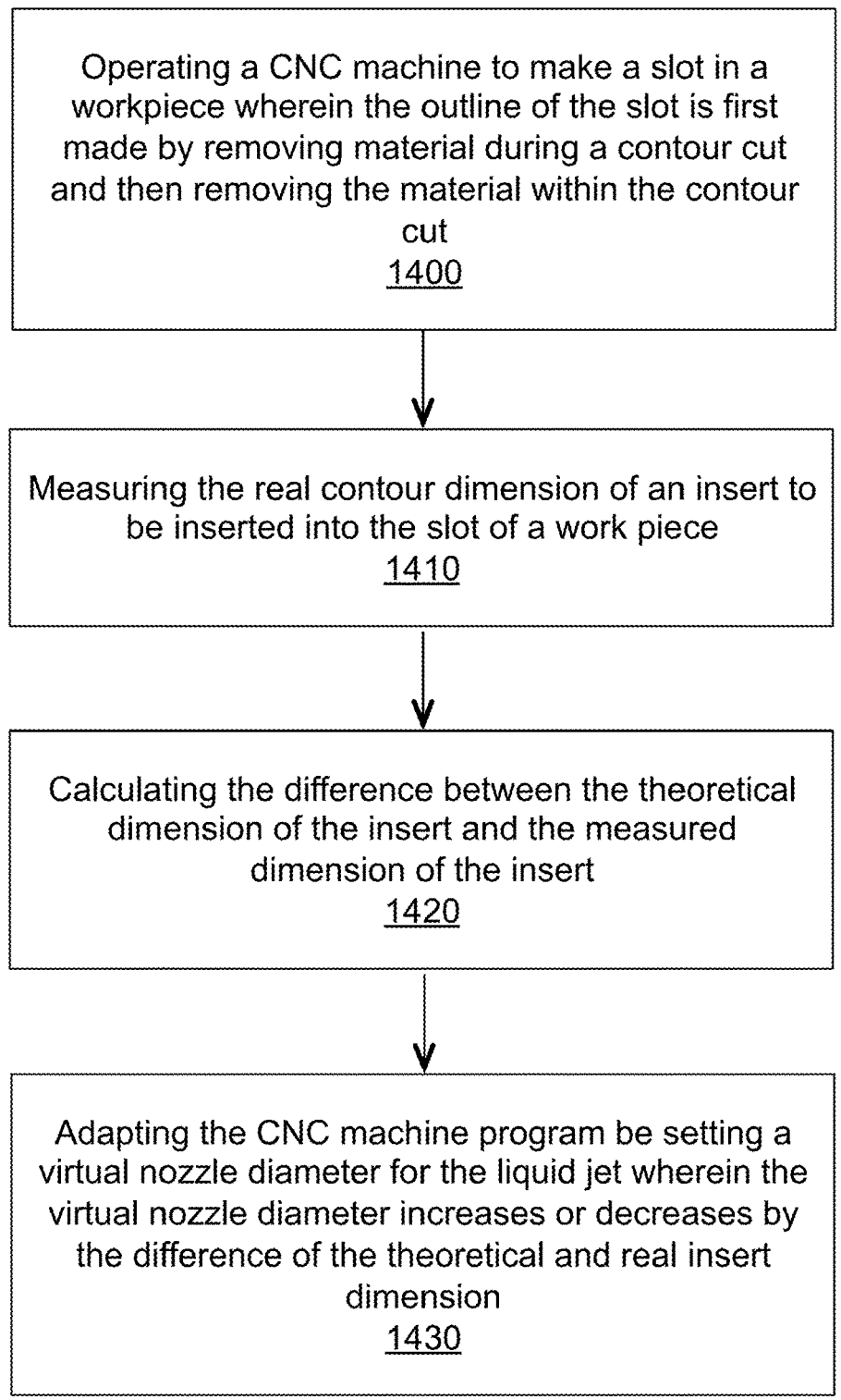
FIG. 14 illustrates a flow chart for reacting on tolerances of an element to be inserted into a slot, according to some embodiments.

FIG. 14 illustrates a flow chart for reacting on tolerances of an element to be inserted into a slot, according to some embodiments. Operation 1400 uses a CNC machine to make a slot in a workpiece wherein the outline of the slot is first made by removing material during a contour cut and then removing the material within the contour cut. Operation 1410 measures the real contour dimension of an insert to be inserted into the slot of a work piece. Operation 1420 calculates the difference between the theoretical dimension of the insert and the measured dimension of the insert. Operation 1430 adapts the CNC machine program by setting a virtual nozzle diameter for the liquid jet wherein the virtual nozzle diameter increases or decreases by the difference of the theoretical and real insert dimension.

In some embodiments, the present invention discloses a method of easy reaction on tolerance of a dimension of an element to be inserted into a slot (e.g. a sealing element) by adapting a slot width of a workpiece (e.g. a turbine element).

Figure 15A:
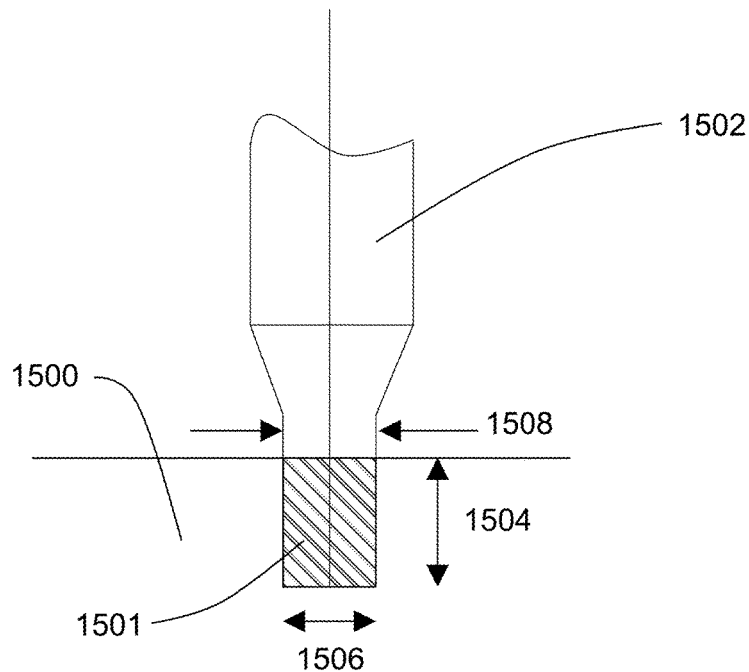
FIGS. 15A-15B illustrate tolerance compensation for slots made using a mechanical milling tool and a liquid jet laser system, according to some embodiments.
Figure 15B:
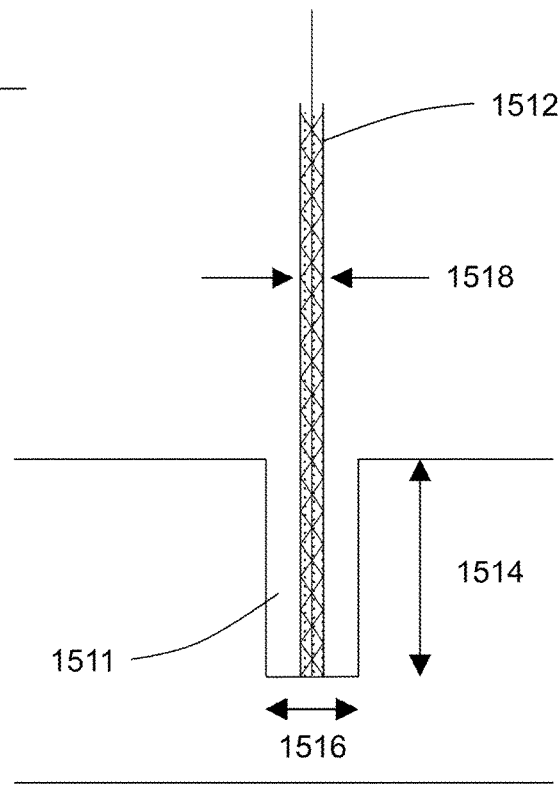

FIGS. 15A-15B illustrate tolerance compensation for slots made using a mechanical milling tool and a liquid jet laser system, according to some embodiments. In FIG. 15A, a mechanical milling tool 1502 makes a slot by using an effective milling tip 1501. A slot depth 1504 and a slot width 1506 are directly linked to the dimension 1508 of the milling tip 1501, e.g. a milling tool 1502 can only make a slot that is of an equal width 1506 as the tip 1501 of the milling tool 1502. In particular, if an inserting element, e.g. a sealing element is delivered with a tolerance that makes a width of such element narrower, then the mechanical milling tool 1502 will not be able to make a narrower slot 1506 than the dimension 1508 of the milling tip 1501. The slot depth that can be created with a mechanical milling tool is furthermore limited to an effective height 1504 of the milling tip 1501 and a tool shank height.

In FIG. 15B, a liquid jet laser 1512 makes a slot by laser removal of material from a work piece. A diameter of the liquid jet 1518 is much narrower than a dimension of the slot 1511. A slot with a depth dimension 1514 and a width dimension 1516 can be made in a two-step cutting process wherein at a first step, a contour cut is performed at a first laser power, a first speed or a first amount of iteration to fix a width dimension 1516 and a depth dimension 1514 of the slot. In a second step, a material removal cut is performed at a second laser power, a second speed or a second amount of iteration to clear a remaining material from the work piece to form a slot width 1516 and a slot depth 1514. The small diameter of the liquid jet 1518 allows a reaction on the tolerance of an insertion element with either a negative tolerance or a positive tolerance, e.g. the liquid jet laser can make a narrower slot width 1516 or a larger slot width 1516, without changing a tool, e.g. without changing the diameter of a nozzle to adjust the liquid jet diameter 1518. The effective depth of a slot 1514 can be freely chosen with a liquid-jet-guided laser system and is not limited to a tool dimension 1508 of FIG. 15A.

In some embodiments, the present invention discloses making functional slots in multi-material assemblies that do not uniformly absorb the laser light of a single wavelength. For example, in case of a semiconductor wafer a substrate can be processed with one wavelength very well, but a translucent or transparent protective layer cannot be processed with the same wavelength because of low absorption for such wavelength.

In some embodiments, the present invention discloses efficient cutting of a total desired slot depth or structure in a multi-material assembly. A slot can be a blind slot or a through slot, e.g. a through cut for singulation purpose. This can be achieved by for example simultaneous or sequential usage of different laser wavelengths to meet the absorption properties of the different materials in an assembly. An example can be the combination of an infrared and a green laser, or the combination of a green laser and an ultraviolet laser, or any other combination. To process a semiconductor wafer for example, an infrared or green laser can be used to cut the silicon. An ultraviolet laser can be used to cut a transparent layer, such as low-K material, or transparent substrate material as used in LED or OLED manufacturing.

In some embodiments, the present invention discloses a liquid-jet-guided laser system that focuses multiple laser beams from one or multiple laser sources into a single liquid-jet. For explanatory purposes, the presented figures in this invention show the principal way of operation with 2 different lasers. However, the invention is not limited to this and allows operating a $3^{rd}$ a $4^{th}$ or more laser beams and wavelengths.

Figure 16:
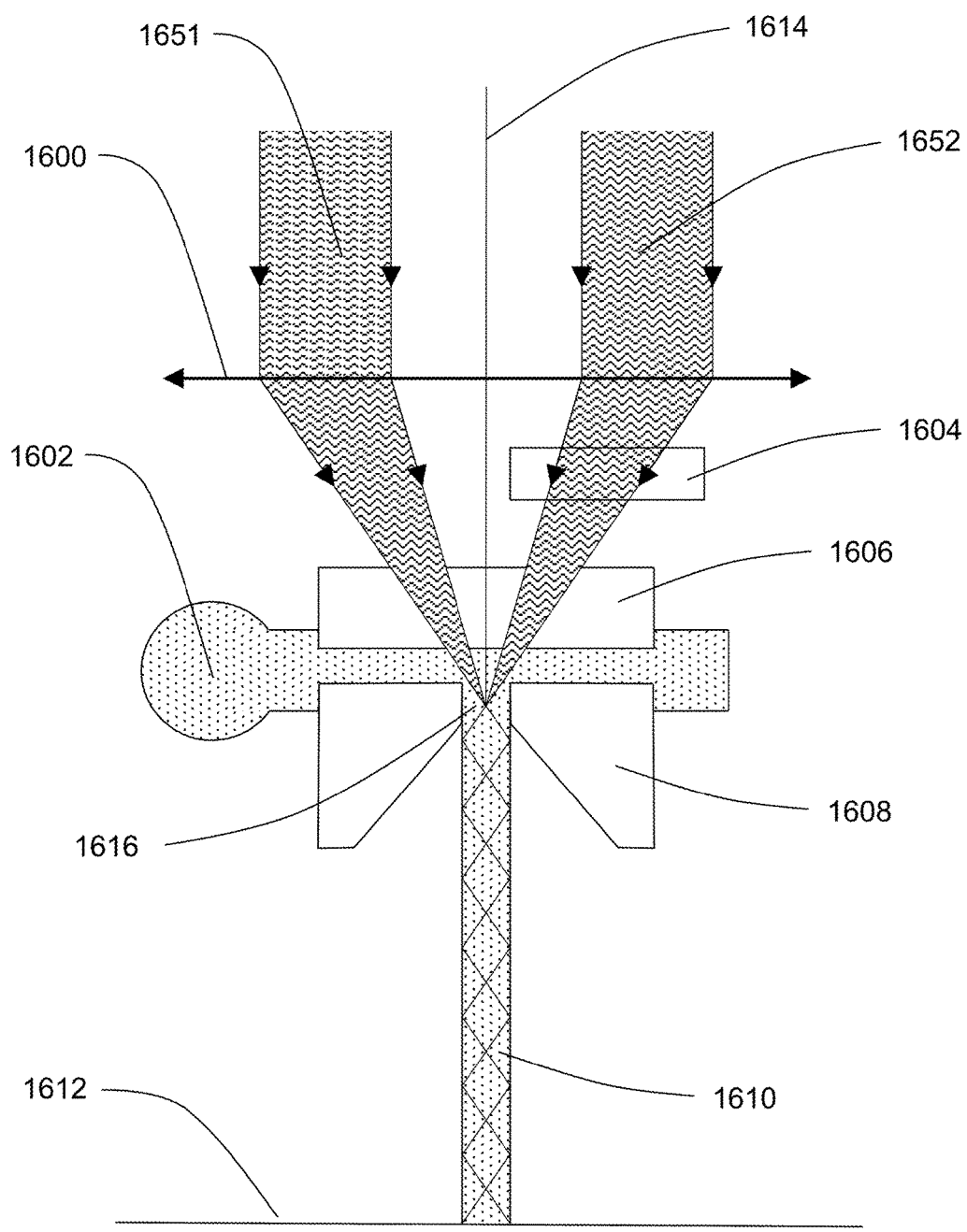
FIG. 16 illustrates a configuration of a liquid-jet-guided laser system for accepting multiple laser beams, according to some embodiments.

FIG. 16 illustrates a configuration of a liquid-jet-guided laser system for accepting multiple laser beams, according to some embodiments. The liquid-jet-guided laser system can include a coupling assembly assembled to a laser focus optic assembly. The coupling assembly can include a window 1606 and a nozzle 1608. The nozzle 1608 can be coupled to the window 1606, leaving a small gap for accepting a liquid, such as water, from a liquid source 1602. The nozzle has an opening in the middle for the liquid to exit as a liquid jet. The nozzle is open at an opposite end. The laser focus optic assembly can include an optical element such as a focus lens 1600. In operation, a liquid, such as water 1602, can be provided to the nozzle 1608, and travel through the opening of the nozzle 1608 to form a liquid jet 1610. A laser beam 1651 or 1652 can be focused, for example, by the lens 1600, to the liquid jet 1610. Internal reflection can confine the laser beam to be within the liquid jet, e.g., the laser beam is guided by the liquid jet 1610. For example, the internal reflection of the laser can start below the nozzle. The liquid jet guided laser beam can flow toward an object surface 1612, where the laser can cut through the object by means of material ablation in a single or multiple pass. A lens 1600 can accept multiple laser beams.

A first laser beam 1651 and a second laser beam 1652 can be guided to a lens 1600, for example, parallel to an optical axis 1614 of such lens 1600. Below the lens 1600 the first laser beam 1651 and the second laser beam 1652 can converge into a common point 1616. An optical element such as an optical glass 1604 can be placed in a path of the second laser beam 1652 between the lens 1600 and the window 1606 to compensate a chromatic (e.g. color) dispersion of the lens 1600. The optical element can also be placed in the path of the second laser beam 1652 above the lens 1600 (not shown). The first laser beam 1651 and the second laser beam 1652 can originate, for, example from a laser source, or from an optical fibre. The first laser beam 1651 and the second laser beam 1652 can be conditioned by an optical element (not shown) such as a beam expander, a collimation lens, a diffractive optical element, or a combination of such optical elements.

In some embodiments, the present invention discloses a simultaneous or sequential treatment of a work piece material with a liquid-jet-guided laser system using two or more lasers of different wavelengths, power levels, frequencies, and/or pulse lengths.

Figures 17A, 17B:
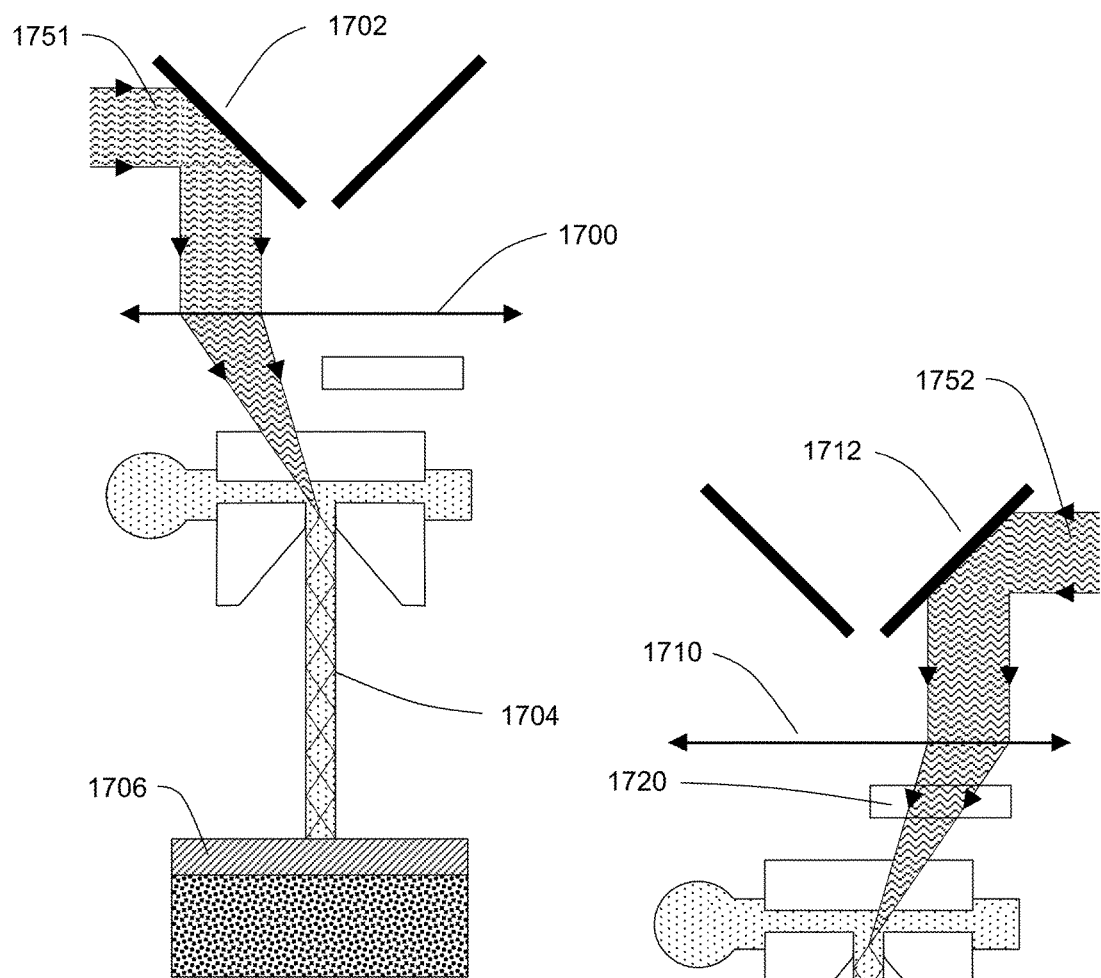
FIGS. 17A-17B illustrate a workpiece treatment with multiple laser beams in a liquid-jet-guided laser system, according to some embodiments.

FIGS. 17A-17B illustrate a workpiece treatment with multiple laser beams in a liquid-jet-guided laser system, according to some embodiments.

In FIG. 17A, a first laser beam 1751 can be guided by an optical element, such as a mirror 1702, towards a lens 1700. The first laser beam 1751 can incident a lens 1700 parallel to an optical axis. Below the lens 1700 the first laser beam 1751 can be converged into a focus point of the lens 1700. The focus spot of the first laser beam 1751 can be coupled into a liquid jet 1704, for example, by calculating a required coupling point as described in U.S. Pat. No. 8,859,988B1, which is hereby incorporated by reference in its entirety for all purposes. A first laser beam 1751 can be guided towards a workpiece surface by internal reflection wherein a first surface material 1706 of the workpiece has a sufficient absorption for the light of the first laser beam 1751. An x-y mechanism, such as a CNC mechanism (with ultimately 5 or 6 axis movement), can also be coupled to the liquid-jet-guided laser beam 1704 or to the workpiece, which can move the liquid-jet-guided laser beam 1704 in any direction to form a pattern a slot and/or a cut. A movement of the liquid-jet-guided laser beam 1704 can be repeated until a first material 1706 of the workpiece is cut through.

In FIG. 17B, a second laser beam 1752 can be guided by an optical element, such as a mirror 1712, towards a lens 1710. The second laser beam 1752 can incident a lens 1710 parallel to an optical axis. Below the lens 1710 the second laser beam 1752 can be converged into the focus point of the lens 1710. The focus spot of the second laser beam 1752 can be coupled into a liquid jet 1714. An optical element such as an optical glass 1720 can be placed in a path of the second laser beam 1752 to compensate a chromatic (e.g. color) dispersion of the lens 1710 e.g. to generate the same focus location as the first laser beam 1751 of FIG. 17A. The second laser beam 1752 can be guided towards a workpiece surface 1716 by internal reflection, wherein a second surface material 1718 of the workpiece has a sufficient absorption for the light of the second laser beam 1752. An x-y mechanism, such as a CNC mechanism (with ultimately 5 or 6 axis movement), can also be coupled to the liquid guided laser beam 1714 or the workpiece, which can position the liquid jet laser beam 1714 in any direction to form a pattern a slot and/or a cut. A movement (or positioning) of the liquid-jet-guided laser beam 1714 can be repeated until the second material 1718 of a workpiece is cut through.

In some embodiments, the present invention discloses a liquid jet laser system to make blind slots and through slots in a multi-material assembly using two or more lasers of different wavelengths, power levels, frequencies, and/or pulse lengths.

Figures 18A, 18B:
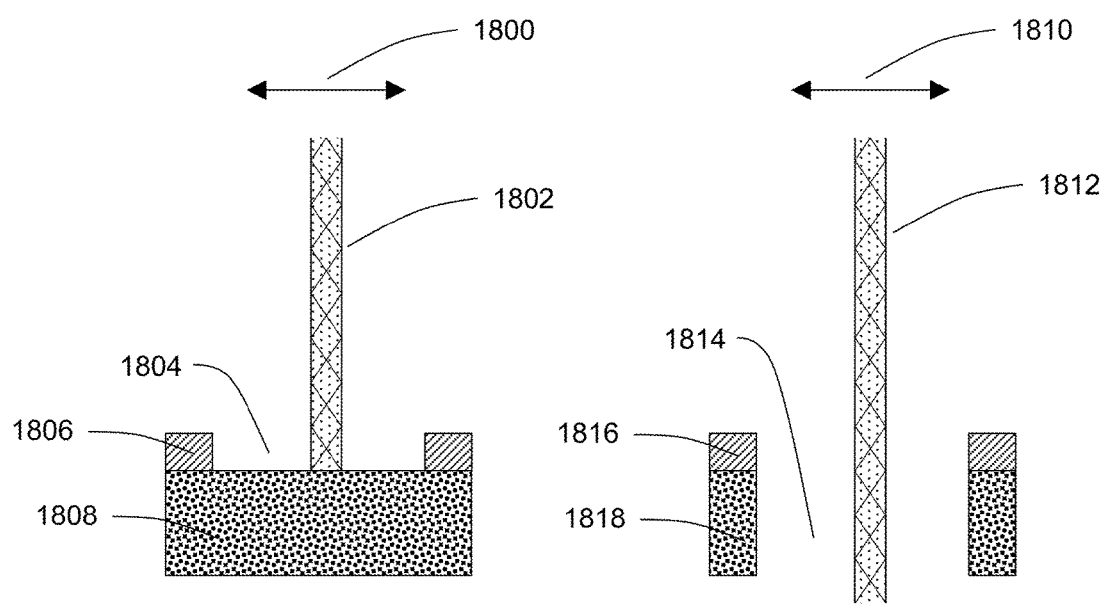
FIGS. 18A-18B illustrate a multi-material workpiece treatment with a liquid-jet-guided laser system, according to some embodiments.

FIGS. 18A-18B illustrate a multi-material workpiece treatment with a liquid-jet-guided laser system, according to some embodiments. In FIG. 18A, a liquid-jet-guided laser beam 1802 can be coupled to an x-y mechanism 1800, such as a CNC mechanism (with ultimately 5 or 6 axis movement). A first amount of iteration, a first pulse length, a first power and a first wavelength can be selected to cut through a first material 1806 of a workpiece (e.g. a transparent coating layer) to create a slot 1804 wherein the bottom of the slot can consist of a second material 1808 of a work piece.

In FIG. 18B, a liquid jet guided laser 1812 can be coupled to an x-y mechanism 1810, such as a CNC mechanism (with ultimately 5 or 6 axis movement). A second amount of iteration, a second pulse length, a second power and a second wavelength can be selected to cut through a second material 1818 of a workpiece (e.g. a silicon substrate) to create a slot 1814 wherein the bottom of the slot can be open to form a through slot, or consist of a third material (not shown) of a work piece.

In some embodiments, the present invention discloses a liquid jet laser system to make blind slots and through slots in a work piece consisting of 2 or more materials with different light absorption properties.

FIG. 19 illustrates a flow chart for laser ablating a multi-material assembly with a liquid-jet laser system, according to some embodiments. Operations 1900 provides a workpiece consisting of a multi-material assembly wherein the individual materials of the assembly have a different laser absorption behavior. Operation 1910 ablates a first portion of a work piece with a first laser wavelength, a first power, a first frequency and/or a first pulse length wherein the ablation process is stopped once the first portion is cut through. Operation 1920 ablates a second portion of a work piece with a second laser wavelength, a second power, a second frequency and/or a second pulse length wherein the ablation process is stopped once the second portion is cut through.

In some embodiments, the present invention discloses methods for fabricating turbine elements, and particularly for liquid-jet-guided laser cutting of cooling structures and/or slots. Turbines, for example in aero engines or in power generation comprises of multiple turbine elements. Such elements are exposed to high temperatures; hence, effective cooling of such elements is required to prevent damage and allow effective operation. Today, cooling is for example achieved by making cooling holes in turbine elements to generate a flow of air thru the bulk material. Such cooling holes are typically drilled with a laser or by using a spark electrode.

In some embodiments, the present invention discloses methods for cooling a turbine element by utilizing non-round features, such as cooling slots. Liquid-jet guided laser technology, as for example described in patent EP 1940579B1 and U.S. Pat. No. 8,859,988B1, which are hereby incorporated by reference in their entirety for all purposes, can be used to make blind slots and thru slots in turbine element that are 0.01-2 mm wide.

In some embodiments, the liquid-jet-guided laser can be mount to an x-y mechanism such as a CNC machine, ultimately with 5 or 6 axis to precisely follow the topography of a turbine element surface. A slot can have the same width as the diameter of the liquid-jet, for example 0.05 mm or 0.08 mm. In such case, the amount of laser passes, as well as the laser speed and the laser power determine the achievable depth of the slot or the time to achieve a thru slot. A cooling slot can also have a larger width, such as 0.1 mm or 0.5 mm or 1.0 mm. A cooling slot can be any freeform shape such as a straight line or a wave pattern. Such freeform can be used to adapt the cooling slot shape to achieve best aerodynamic performance in combination with sufficient cooling performance.

In some embodiments the present inventions discloses cooling slots in turbine elements to increase the structural integrity of the part while maintaining sufficient cooling capacity. In particular, for new materials such as Ceramic Matrix Composites, liquid-jet-guided laser can be a preferential treatment. Such material can be difficult to treat with spark electrode depending on the electrical conductivity properties.

The liquid-jet-guided laser ablation process of forming cooling structures in turbine elements can provide significant advantages over conventional drilling processes. For example, the cooling drills are predominantly round, for example, by using round mechanical drillers, round laser beams, round erosion electrode.

In some embodiments, the present invention discloses utilizing a liquid-jet-guided laser to produce slots in turbine blades with substantially reduced or barely detectable heat or temperature influence as is common for laser drilling as well as for spark erosion. The liquid-jet-guided laser beam can be used to produce large parallel cuts or slits, which can allow freedom of design for cooling structures to be according to the actual cooling function and no longer according to the established production technology.

In some embodiments, the present invention discloses slots having depth and sidewall profiles that are configured to optimize a cooling of a turbine blade. The turbine can be at a high temperature during a high speed spinning and fuel burning process, thus cooling slots can be used to cool the turbine blades. The slots can have continuous sidewall and depth profiles that are configured to optimize a cooling gas flow. For example, the shapes of the slots can conform to the flow dynamic, including having minimum or reduced dead spaces or stagnant areas.

Figure 20A:
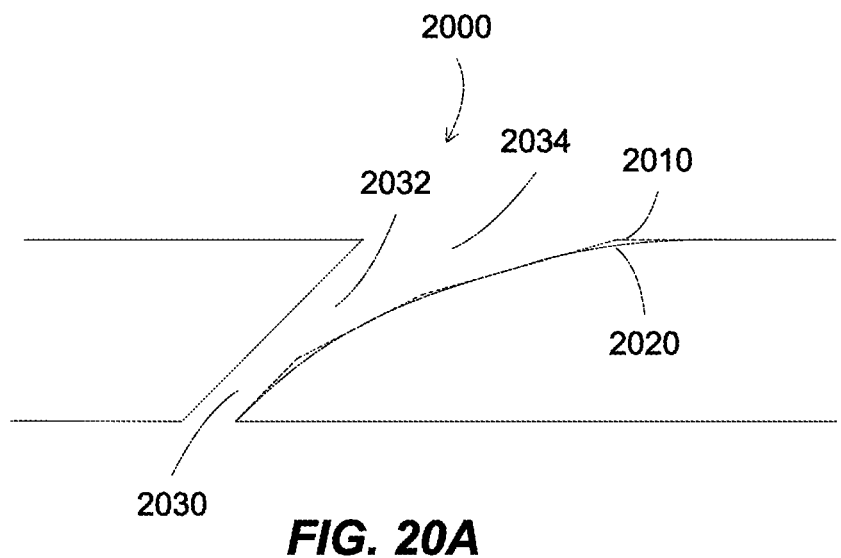
FIGS. 20A-20B illustrate a cross section and a top view of a turbine cooling channel, according to some embodiments.
Figure 20B:
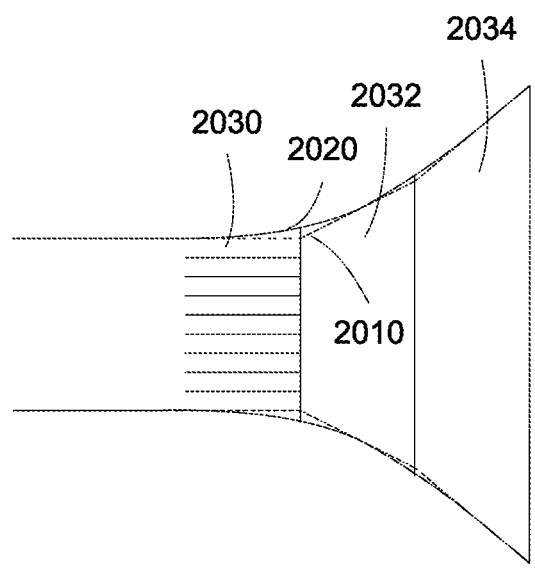

FIGS. 20A-20B illustrate a cross section and a top view of a turbine cooling channel, according to some embodiments. A turbine blade can have a row of film cooling slots located adjacent to the trailing edge region of the blade, for example, to reduce or eliminate a hot gas flow migrating toward the blade tip. The turbine blade can be used in an industrial gas turbine engine or an aero engine. In FIG. 20A, a cross section side view of a cooling channel 2000 on a turbine blade. The cooling channel can include a compound angled multi-diffusion film cooling channel. The channel 2000 can include a metering inlet section 2030, a first expansion section 2032 located immediately downstream from the metering section 2030, and a second expansion section 2034 located immediately downstream from the first expansion section 2032. The second expansion section 2034 opens onto the outer airfoil surface. The first expansion section 2032 can have an expansion between 7 and 13 degrees. The second expansion section 2034 can have an additional expansion between 7 and 13 degrees.

In some embodiments, the liquid jet guided laser system can provide a continuous cooling slot 2000, e.g., forming a cooling slot 2000 having continuous cooling walls 2020. The continuous cooling walls 2020, which can be formed by a liquid jet guided laser system, can provide better flow dynamic as compared to straight segmented cooling walls 2030, which can be formed by machining.

Figure 21:
FIG. 21 illustrates a flow chart for forming cooling slots in a turbine blade, according to some embodiments.

FIG. 21 illustrates a flow chart for forming cooling slots in a turbine blade according to some embodiments. Operation 2100 provides a turbine blade. Operation 2110 laser ablates cooling slots in the turbine blade, wherein the laser ablating process is performed by a liquid jet guided laser system.

What is claimed is:

1. A method of manufacturing a slot using a liquid-jet-guided laser system, comprising:
   determining a contour of a slot to be processed into a workpiece;
   processing the slot into the workpiece based on the determined contour,
   wherein the slot is at least one of a blind slot and a through slot,
   wherein the processing comprises precutting the workpiece, and
   wherein precutting the workpiece comprises cutting at least one contour line of the slot into the workpiece to a predetermined depth,
   wherein cutting at least one contour line of the slot comprises following a geometry of an element to be inserted into the slot,
   wherein the processing further comprises removal cutting of the workpiece,
   wherein the removal cutting of the workpiece comprises removal of a material of the workpiece within the at least one contour line of the slot, and
   wherein the removal cutting ceases when the removal of the material of the workpiece reaches the same depth as the at least one contour line of the slot.

2. The method of claim 1, further comprising:
   wherein processing the determined contour of the slot into the workpiece is based on a wavelength, a pulse length, a frequency, a speed, a power, an iteration, and an angle of a laser beam corresponding to the determined contour of the slot and a material of the workpiece.

3. The method of claim 1, further comprising:
   inserting an element into the processed slot of the workpiece, and
   wherein the element is press fitted into the slot of the workpiece.

4. The method of claim 3, further comprising:
   wherein the element is at least one of a sipe and a sealing element.

5. The method of claim 1, further comprising:
   wherein a width of the slot is 0.1 to 2.0 mm, and a depth of the slot is 0.5 to 20 mm.

6. The method of claim 1, further comprising:
   wherein the precutting is operated at least one of a low power and a low speed relative to a power and a speed of the removal cutting.

7. The method of claim 1, further comprising:
   wherein the removal cutting occurs after the precutting.

8. A method of manufacturing a slot using a liquid-jet-guided laser system, comprising:
   determining a contour of a slot to be processed into a workpiece;
   processing the slot into the workpiece based on the determined contour,
   wherein the slot is at least one of a blind slot and a through slot,
   wherein the processing comprises using multiple wavelengths for corresponding materials of a multiple-material workpiece,
   wherein two or more laser beams are focused by a lens into a liquid jet.

9. The method of claim 8, further comprising:
   wherein using multiple wavelengths for corresponding materials of the multiple-material workpiece is sequential or simultaneous.

10. The method of claim 8, further comprising:
    wherein processing the determined contour of the slot into the workpiece is based on a wavelength, a pulse length, a frequency, a speed, a power, an iteration, and an angle of a laser beam corresponding to the determined contour of the slot and a material of the workpiece.

11. The method of claim 8, further comprising:
inserting an element into the processed slot of the workpiece, and wherein the element is press fitted into the slot of the workpiece.

12. The method of claim 11, further comprising:
wherein the element is at least one of a sipe and a sealing element.

13. The method of claim 8, further comprising:
wherein the processing comprises using a specific wavelength of an electromagnetic spectrum for a corresponding material of the workpiece.

14. The method of claim 13, further comprising:
wherein the specific wavelength of the electromagnetic spectrum for a corresponding material of the workpiece is determined based on an absorption property of the material of the workpiece.

15. The method of claim 8, further comprising:
wherein a width of the slot is 0.1 to 2.0 mm, and a depth of the slot is 0.5 to 20 mm.

16. The method of claim 8, further comprising:
wherein the processing comprises precutting the workpiece, and
wherein precutting the workpiece comprises cutting at least one contour line of the slot into the workpiece to a predetermined depth,
wherein cutting at least one contour line of the slot comprises following a geometry of an element to be inserted into the slot,
wherein the processing further comprises removal cutting of the workpiece,
wherein the removal cutting of the workpiece comprises removal of a material of the workpiece within the at least one contour line of the slot, and
wherein the removal cutting ceases when the removal of the material of the workpiece reaches the same depth as the at least one contour line of the slot.

17. The method of claim 16, further comprising:
wherein the precutting is operated at least one of a low power and a low speed relative to a power and a speed of the removal cutting.

18. The method of claim 16, further comprising:
wherein the removal cutting occurs after the precutting.

* * * * *